United States Patent
Ishii et al.

(10) Patent No.: US 6,801,871 B2
(45) Date of Patent: Oct. 5, 2004

(54) METHOD AND EQUIPMENT FOR ASSESSING THE LIFE OF MEMBERS PUT UNDER HIGH IN-SERVICE TEMPERATURE ENVIRONMENT FOR LONG PERIOD

(75) Inventors: Fumiharu Ishii, Tokyo (JP); Nagatoshi Okabe, Matsuyama (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 10/679,457

(22) Filed: Oct. 7, 2003

(65) Prior Publication Data

US 2004/0107067 A1 Jun. 3, 2004

Related U.S. Application Data

(62) Division of application No. 09/833,622, filed on Apr. 13, 2001, now Pat. No. 6,671,647.

(30) Foreign Application Priority Data

Apr. 14, 2000 (JP) ........................................ 2000-114126
Jan. 15, 2001 (JP) ........................................ 2001-006859

(51) Int. Cl.[7] ............................ G01B 3/44; G01K 17/00
(52) U.S. Cl. ........................ 702/136; 702/34; 702/185
(58) Field of Search ............................... 702/33, 34, 42, 702/130, 136, 185; 73/660, 787, 23.2; 374/29, 43; 700/289; 219/76.15; 29/527.7

(56) References Cited

U.S. PATENT DOCUMENTS

| | | | |
|---|---|---|---|
| 3,696,502 A | 10/1972 | Darling | 29/527.7 |
| 4,875,170 A | 10/1989 | Sakurai et al. | 702/34 |
| 5,455,777 A | 10/1995 | Fujiyama et al. | 702/34 |
| 5,914,055 A | 6/1999 | Roberts et al. | 219/76.15 |
| 6,532,421 B2 | 3/2003 | Miwa | 702/34 |

FOREIGN PATENT DOCUMENTS

| | | |
|---|---|---|
| JP | 1-27378 | 5/1989 |
| JP | 04143634 A * | 5/1992 |

OTHER PUBLICATIONS

JP 04143634 A: "Method for estimating thermal fatigue life of metal material", Kimura et al., Abstract.*
Masood et al., "A modified approach for life assessment of high temperature power plant components," WEC 88, Putra Malaysia University, Jul. 1999, [on line], <URL:http://eng.upm.edu.my/wec99>.
K. Kimura, et al., Conference on Life Extension and Assessment of Fossil Plants, pp. 2–17, "Life Assessment and Diagnosis System For Steam Turbine Components," Jun. 2–4, 1985.
Miwa, Method for estimating a life of apparatus under narrow–band random stress variation, Pub. No. US 2001/0034581 A1, Pub. Date: Oct. 25, 2001.

* cited by examiner

*Primary Examiner*—John Barlow
*Assistant Examiner*—John H Le
(74) *Attorney, Agent, or Firm*—Oblon, Spivak, McClelland, Maier & Neustadt, P.C.

(57) ABSTRACT

For each component which is used at a high in-service temperature for a long period, its creep damage degree is approximated by a relational expression containing the Larson-Miller parameter. The creep damage degree is estimated by an approximation expression obtained by determining constants for each component. The creep damage degree is subjected to Weibull statistical analysis to estimate the creep damage degree probabilistically. Also, the thermal fatigue and damage degree obtained by an approximation expression is likewise subjected to Weibull statistical analysis to estimate the thermal fatigue and damage degree probabilistically. Therefore, the probabilistically estimated creep damage degree and the probabilistically estimated thermal fatigue and damage degree allows the life of each component subjected to a high in-service temperature to be assessed precisely and quickly.

33 Claims, 16 Drawing Sheets

METHOD AND EQUIPMENT FOR ASSESSING THE LIFE OF MEMBERS PUT UNDER HIGH IN-SERVICE TEMPERATURE ENVIRONMENT FOR LONG PERIOD

CROSS-REFERENCE TO RELATED APPLICATIONS

This application is a Divisional of application Ser. No. 09/833,622 filed on Apr. 13, 2001 now U.S. Pat. No. 6,671,647. This application is based upon and claims the benefit of priority from the prior Japanese Patent Applications No. 2000-114126, filed Apr. 14, 2000; and No. 2001-006859, filed Jan. 15, 2001, the entire contents of both of which are incorporated herein by reference.

BACKGROUND OF THE INVENTION

The present invention relates to a method and equipment for assessing the duration of life of members put under a high in-service temperature environment for a long period and more specifically to a method and equipment for assessing the duration of life of each member put under a high in-service temperature environment for a long period, for example, the high or intermediate pressure rotor, the high or intermediate pressure casing, and the main stop valve, that are incorporated into a steam turbine unit.

Conventionally, a member which is put under a high in-service temperature environment for a long period, for example, the rotor in a steam turbine unit, is subjected continuously to a load for a long period in a high in-service temperature environment and hence suffers creep damage; as a consequence, its duration of life is reduced. Also, the rotor is repeatedly subjected to thermal stresses at the times of starting and stopping the turbine, resulting in the reduced duration of life. To ensure the reliability of the steam turbine unit over a long period, therefore, it is important to assess the duration of life of its structural members with precision.

Heretofore, as a technique to assess the life of such members, one has been developed and put to practical use which involves subjecting virgin materials for new components and used materials of components which have been put at high in-service temperatures and are to be scrapped at the time of replacement to a destructive test and assessing their residual life on the basis of the material characteristic test results. That is, in the destructive test, the creep rupture strength and the low-cycle fatigue strength of those materials are obtained on a laboratory basis. The creep rupture strength and the low-cycle fatigue strength are obtained as a function of a certain parameter, for example, a function of hardness. In inspecting a steam turbine unit regularly, the hardness of the individual members is measured as their intrinsic parameter. From the intrinsic parameters of the individual members, i.e., the creep rupture strength and low-cycle fatigue strength data as a function of hardness, the operation history of the unit and its residual life allowing for future operation are assessed.

An example of a technique to assess the residual life is one disclosed in Jpn. Pat. Appln. KOKAI No. 1-27378. The technique of residual life assessment disclosed in this publication involves calculating the temperature-stress characteristic of a structural member subjected to a high in-service temperature from its working condition value, calculating the material characteristic of the structural member from its hardness, calculating the damage cumulative value of the structural member by adding corrections corresponding to the operation history to these characteristics by condition setup equipment, and comparing the damage cumulative value with an allowable value. It is said that such a technique can predict accurately the time when a crack is initiated in the structural member.

Conventionally, the life of individual members is obtained for each unit. In this life assessment, the creep damage and the thermal fatigue damage or low-cycle fatigue damage are obtained by linear cumulative damage rules and a method to assess the residual life allowing for future operation is adopted. Thus, the conventional methods, which assess the residual life for each unit or for each member in each unit, can produce variations in assessment and cannot make assessment quickly. From this point of view, the development of a technique to assess the residual life of structural members precisely and quickly has been demanded in recent years.

Conventionally, in assessing the life of a member in a turbine or the like, its hardness is measured at regular inspection (in-service inspection) time and the life is assessed utilizing the measured hardness. Unless the hardness is measured at regular inspection time, life assessment cannot be made with precision. It is difficult to measure the hardness at any desired time.

To ensure precise and quick life assessment, a method is required which collects changes with time in the hardness of each individual member and stochastically estimates the hardness of a member in a turbine or the like to thereby assess its life.

BRIEF SUMMARY OF THE INVENTION

It is an object of the present invention to provide a method and equipment which permit the life of a structural member put under a high in-service temperature environment to be assessed precisely and quickly.

It is another object of the present invention to provide a method and equipment which, by collecting changes with time in the hardness of each individual member put under a high in-service temperature environment, permits its hardness to be estimated stochastically and its life to be assessed precisely and quickly.

According to an aspect of the present invention, there is provided a method of assessing the life of a member subjected to a high in-service temperature for a long period comprising the steps of:

determining a Larson-Miller parameter for the member whose life is to be assessed from the in-service temperature and a service time period during which the member is used in-service temperature, and calculating the creep damage degree on the basis of cumulative damage rules from the hardness and stress of the member to establish data; and approximating the relationship between the Larson-Miller parameter and the creep damage degree by an expression including an exponential function.

According to an aspect of the present invention there is also provided a method of assessing the life of a member subjected to a high in-service temperature for a long period comprising the steps of:

determining a Larson-Miller parameter for the member whose life is to be assessed from the in-service temperature and service time period during which the member is used in-service temperature and using data established by calculating the creep damage degree on the basis of cumulative damage rules from the hardness and stress of the member to approximate the relationship between the Larson-Miller parameter and the creep damage degree by an expression including an exponential function; and estimating the creep damage degree by adding probabilistic statistical processing to the approximate expression.

Furthermore, according to an aspect of the present invention there is provided a method of assessing the life of a member provided in an apparatus which is started and stopped over and over again and subjected to a high in-service temperature for a long period while the apparatus is being operated comprising the steps of:

calculating an estimation parameter which is a function of a set of the start count and thermal stress, and thermal fatigue and damage degree based on cumulative damage rules for the member whose life is to be assessed and establishing data; and approximating the relationship between the estimation parameter and the thermal fatigue and damage degree by an approximate expression.

According to an another aspect of the present invention, there is also provided an apparatus for assessing the life of a member subjected to a high in-service temperature for a long period, comprising:

means for determining a Larson-Miller parameter for the member whose life is to be assessed from the in-service temperature and a service time period during which the member is used in-service temperature, and calculating the creep damage degree on the basis of cumulative damage rules from the hardness and stress of the member to establish data; and means for approximating the relationship between the Larson-Miller parameter and the creep damage degree by an expression including an exponential function.

According to an yet another aspect of the present invention, there is also provided an n apparatus for assessing the life of a member subjected to a high in-service temperature for a long period comprising:

means for determining a Larson-Miller parameter for the member whose life is to be assessed from the in-service temperature and service time period during which the member is used in-service temperature and using data established by calculating the creep damage degree on the basis of cumulative damage rules from the hardness and stress of the member to approximate the relationship between the Larson-Miller parameter and the creep damage degree by an expression including an exponential function; and means for estimating the creep damage degree by adding probabilistic statistical processing to the approximate expression.

Furthermore, according to a yet another aspect of the present invention, there is provided an apparatus for assessing the life of a member provided in an apparatus which is started and stopped over and over again and subjected to a high in-service temperature for a long period while the apparatus is being operated comprising:

means for calculating an estimation parameter which is a function of a set of the start count and thermal stress, and thermal fatigue and damage degree based on cumulative damage rules for the member whose life is to be assessed and establishing data; and means for approximating the relationship between the estimation parameter and the thermal fatigue and damage degree by an approximate expression.

Furthermore, according to a yet further aspect of the present invention, there is also provided an apparatus for assessing the life of a member provided in an apparatus which is started and stopped over and over again and subjected to a high in-service temperature for a long period while the apparatus is being operated comprising:

means for using an estimation parameter which is a function of the start count and thermal stress, and data established by calculating thermal fatigue and damage degree based on cumulative damage rules, for the member whose life is to be assessed, and approximating the relationship between the estimation parameter and the thermal fatigue and damage degree by an approximate expression; and means for estimating the thermal fatigue and damage degree by adding probabilistic statistical processing to this approximate expression.

Furthermore, according to a yet another aspect of the present invention, there is provided a method of assessing the life of a member subjected to a high in-service temperature for a long period comprising the steps of:

determining a Larson-Miller parameter for the member whose life is to be assessed from the in-service temperature and time of the member and using data established by calculating the creep damage degree on the basis of cumulative damage rules from the hardness and stress of the member to approximate the relationship between the Larson-Miller parameter and the creep damage degree by an expression including an exponential function;

prompting a terminal connected through a network to input the in-service time period, of the member whose life is to be assessed;

assessing the life of the member from the in-service time period, of the member whose life is to be assessed by using the approximate expression; and outputting the assessed life to the terminal.

According to a yet further aspect of the present invention, there is provided an apparatus for assessing the life of a member subjected to a high in-service temperature for a long period comprising:

means for determining a Larson-Miller parameter for the member whose life is to be assessed from the in-service temperature and time of the member and using data established by calculating the creep damage degree on the basis of cumulative damage rules from the hardness and stress of the member to approximate the relationship between the Larson-Miller parameter and the creep damage degree by an expression including an exponential function;

means for prompting a terminal connected through a network to input the in-service time period, of the member whose life is to be assessed;

means for assessing the life of the member from the in-service time period, of the member whose life is to be assessed by using the approximate expression; and means for outputting the assessed life to the terminal.

According to a yet further aspect of the invention, there is provided an apparatus for assessing the life of a member subjected to a high in-service temperature for a long period comprising:

means for determining a Larson-Miller parameter for the member whose life is to be assessed from the in-service temperature and service time period during which the member is used in-service temperature and using data established by calculating the creep damage degree on the basis of cumulative damage rules from the hardness and stress of the member to approximate the relationship between the Larson-Miller parameter and the creep damage degree by an expression including an exponential function and further to prepare an expression estimating the creep damage degree added with probabilistic statistical processing;

means for prompting a terminal connected through a network to input the in-service time period, and the hardness of the member whose life is to be assessed;

means for assessing the life of the member from the in-service time period, of the input member; and means for outputting the assessed life to the terminal.

In the above described method and apparatus, the Larson-Miller parameter P is calculated by an expression given as $$P=(T+273)(\log t+C)$$

where C is the material constant, T is the in-service temperature and t is the in-service time period, and the creep damage degree $\phi c$ based upon the cumulative damage rules is calculated by an expression given as $$P'=A1(\sigma)H+B1(\sigma)$$

where $\sigma$ is the stress, and H is the hardness, $$P'=(T+273)(\log tr+C)$$

where C is the material constant, T is the in-service temperature, and tr is creep rupture life, $$\phi c=t/(tr+t) \text{ or } \phi c=t/tr$$

where $\phi c$ is the creep damage degree, and where, when data of the hardness of the portion under a high in-service temperature and a high stress of the member whose life is to be assessed is used, $\phi c=t/(tr+t)$ is employed, and when data of the hardness of the portion under a high in-service temperature and a low stress is used to assess the portion of the member under a high in-service temperature and a high stress, $\phi c=t/tr$ is employed.

In the above described method and apparatus, the creep damage degree $\phi c$ is obtained by $$\phi c=1-exp(A \cdot P^B)$$

wherein A and B are constants and P is the Larson-Miller parameter.

In the above described method and apparatus, the creep damage degree where the probabilistic statistical processing is added to the approximate expression is also estimated by an expression given as $$\phi c=\{1-exp(A-P^B)\}\cdot\{\beta \cdot ^m\sqrt{\ln(1-Pf)^{-1}}\}$$

where m is the Weibull coefficient, $\beta$ is the scale parameter, and Pf is the cumulative probability.

the cumulative probability Pf corresponds to the cumulative probability Pf defined by the following expression and the cumulative probability Pf depending on the hardness is obtained by an expression given as $$Pf=1-exp\{-(\mu/\beta)^m\}$$

where m is the Weibull coefficient, $\beta$ is the scale parameter, and $\mu$ is the hardness of the member (experimental value)/the hardness of the member (estimated value), and further the estimated value of the hardness of the member is obtained by an equation using the least squares method given as $$at+b,$$

where t is the total operation time when the hardness of the member is measured, and a and b are constants.

In the above described method and apparatus, the hardness of the member is estimated by a probabilistic expression given as $$H=(at+b)(\beta \cdot ^m\sqrt{\ln(1-Pf)^{-1}})$$

wherein H is the hardness of the member, t is the total operation time when the hardness of the member is measured, a and b are constants, m is the Weibull coefficient, $\beta$ is the scale parameter, and Pf is the cumulative probability corresponding to the hardness of the member.

In the above described method and apparatus, the estimation parameter q is given by an expression of $$q=N(\sigma c \cdot nc/N+\sigma w \cdot nw/N+\sigma h \cdot nh/N)^\alpha$$

where $\alpha$ is the constant, $\sigma c$ is the thermal stress of the member at cold start time, $\sigma w$ is the thermal stress of the member at warm start time, $\sigma h$ is the thermal stress of the member at hot start time, N is the total start count, nc is the cold start count, nw is the warm start count, and nh is the hot start count, and the thermal fatigue and damage degree is approximated by an expression given as $$\phi f=C \cdot q$$

where Cf is a constant.

In the above described method and apparatus, the thermal fatigue and damage degree obtained by adding the probabilistic statistical processing to the approximate expression is given by an expression of $$\phi f=Cf \cdot q(\beta \cdot ^m\sqrt{\ln(1-Pf)^{-1}})$$

where m is the Weibull coefficient, $\beta$ is the scale parameter, and Pf is the cumulative probability.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Hereinafter, the method and equipment for assessing the life of a member that is put under a high in-service temperature environment for a long period, in accordance with the present invention will be described with reference to the accompanying drawings.

The method of life assessment of the invention is generalized such that the creep damage degree and the thermal fatigue and damage degree of a structural member which is put under a high in-service temperature environment for a long period are calculated on the basis of cumulative damage rules, the calculated creep damage degree and thermal fatigue and damage degree are stored as data in a storage device, and the residual life of that member is predicted and analyzed probabilistically using both data on the basis of the Weibull statistical analysis.

In this life assessment, the material strength characteristic is estimated from hardness data and its life is predicted based on those data, history data, design data.

Hereinafter, an embodiment of equipment for assessing the life of a member which is put under a high in-service temperature environment for a long period will be described with reference to the drawings.

Figure 1A:
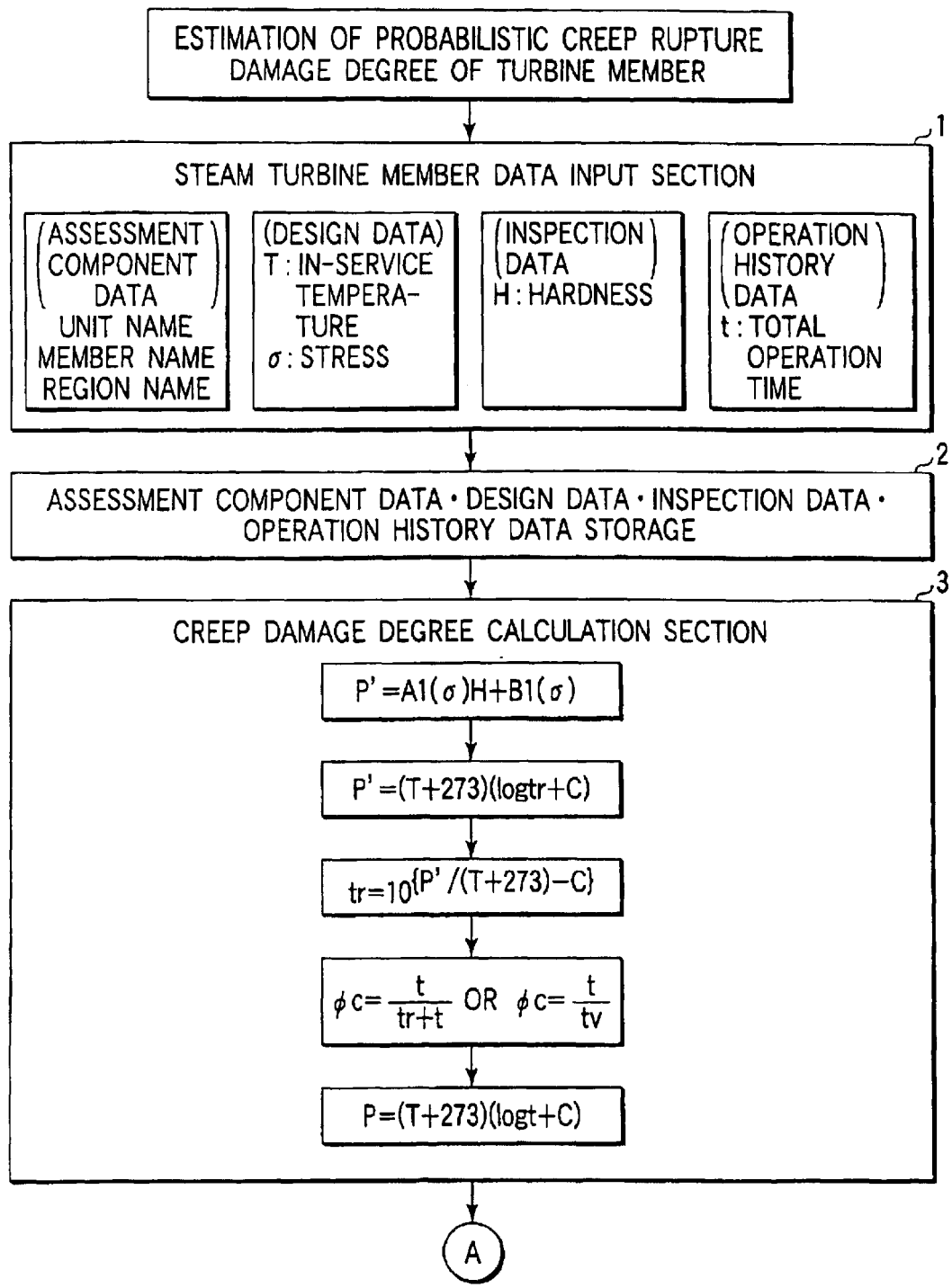
FIGS. 1A and 1B are block diagrams of equipment for assessing the life of a member put under a high in-service temperature environment for a long period based on the creep rupture damage degree in accordance with an embodiment of the present invention.
Figure 1B:
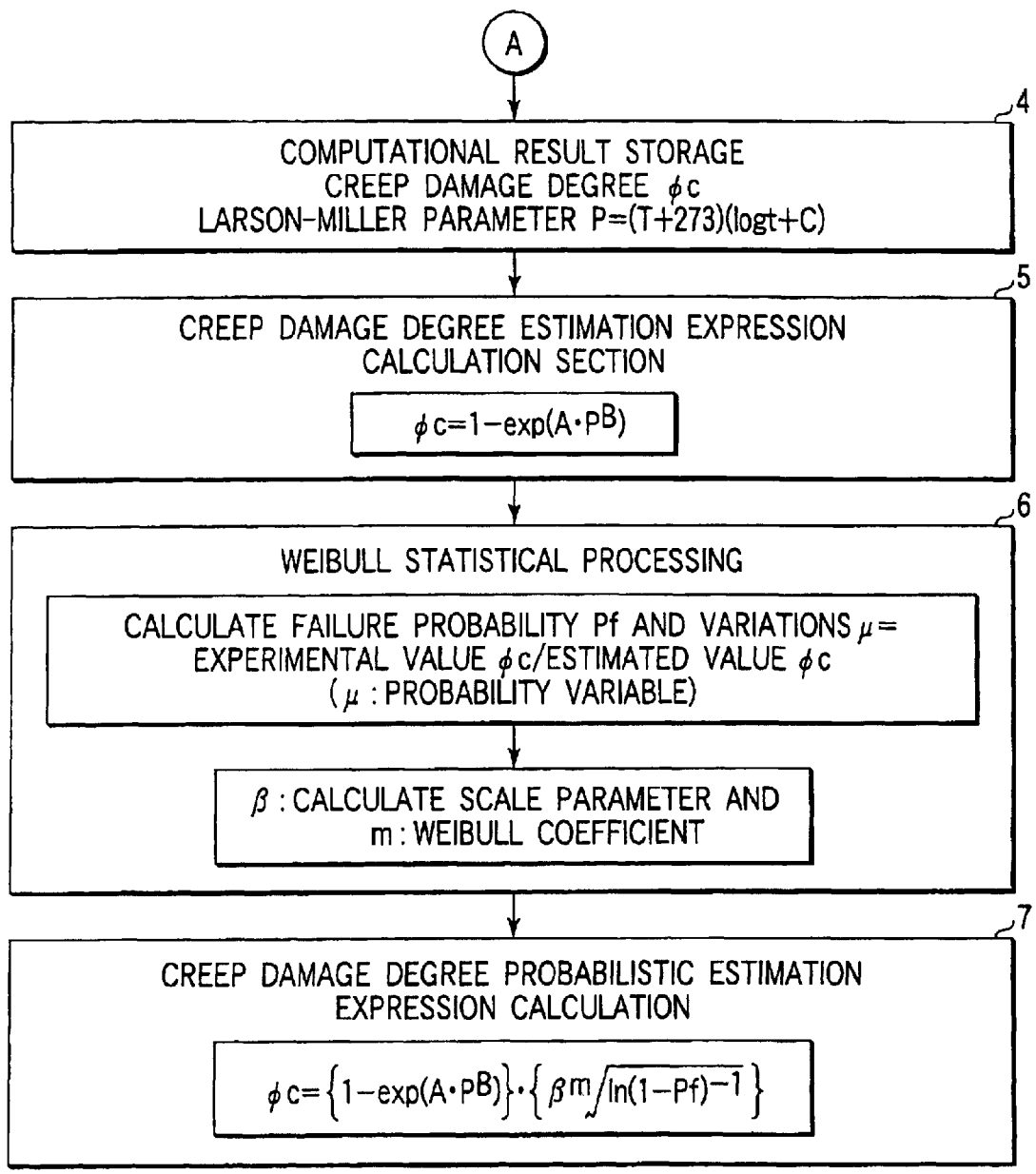

FIGS. 1A and 1B are functional block diagrams for use in explanation of the equipment for assessing the life of a structural member used at a high in-service temperature in accordance with the present invention. A system that estimates probabilistically the creep damage degree of a steam turbine member includes functions shown in FIG. 1A. That is, the estimation system is composed of an input section 1 for inputting data concerning a member in a steam turbine, a storage section 2 for storing the data, a calculation section 3 for calculating the creep damage degree on the basis of the data, a storage section 4 for storing the calculated value from the calculation section, and a calculation section 5 for estimating the creep damage degree using a certain approximation expression.

The data concerning the member in the steam turbine entered into the data input section 1 include assessed component data, design data, inspection data, and operation history data. The assessed component data includes the unit name of a component as the subject of residual life assessment, the material name of the component, and the region name of the component. The design data includes the temperature T and the stress a to which the structural member is subjected during the steady-state operation of the steam turbine. The inspection data includes the hardness (Vickers hardness) H of the structural member measured at the time of in-service inspection of the steam turbine. The operation history data is the total operation time of the steam turbine.

The storage section 2 is stored with the assessed component data, the design data, the inspection data, and the operation history data input from the input section 1 of data relating to the steam turbine member. Those data are accessed and output when they are needed in the calculation sections 3 and 5.

The creep damage degree calculation section 3 calculates the creep damage degree φc on the basis of pre-stored expressions (1) through (4).

At the time of steady operation under conditions of a high in-service temperature and a constant stress, creep damage occurs in each member and its creep rupture dame degree φc can be estimated from the hardness H and the stress, i.e., steady-state stress a through the Larson-Miller parameter P' given by $$P'=A1(\sigma)H+B1(\sigma) \tag{1}$$

where σ is the stress, H is the Vickers hardness and so on, and $A_1$ and $B_1$ are constants.

On the other hand, the Larson-Miller parameter P' is represented, as a function of the in-service temperature T(K) and the creep rupture life tr, by $$P'=(T+273)(\log tr+C) \tag{2}$$

where C is the material constant.

Thus, by measuring the hardness H of a member at the time of in-service inspection of the steam turbine or estimating the hardness of the member at a certain point of time as will be described later, knowing the in-service temperature T (K) and the stress u allows the life up to the time the member undergoes creep rupture life time or period tr to be estimated by $$tr=10\{P'/(T+273)-C\} \tag{3}$$

where C is the material constant, T is the in-service temperature, and tr is creep rupture life, $$\phi c = t/(tr+t) \text{ or } \phi c = t/tr \quad (4)$$

where $\phi c$ is the creep damage degree, and where, when data of the hardness of the portion under a high in-service temperature and a high stress of the member whose life is to be assessed is used, $\phi c = t/(tr+t)$ is employed, and when data of the hardness of the portion under a high in-service temperature and a low stress is used to assess the portion of the member under a high in-service temperature and a high stress, $\phi c = t/tr$ is employed.

Figure 2:
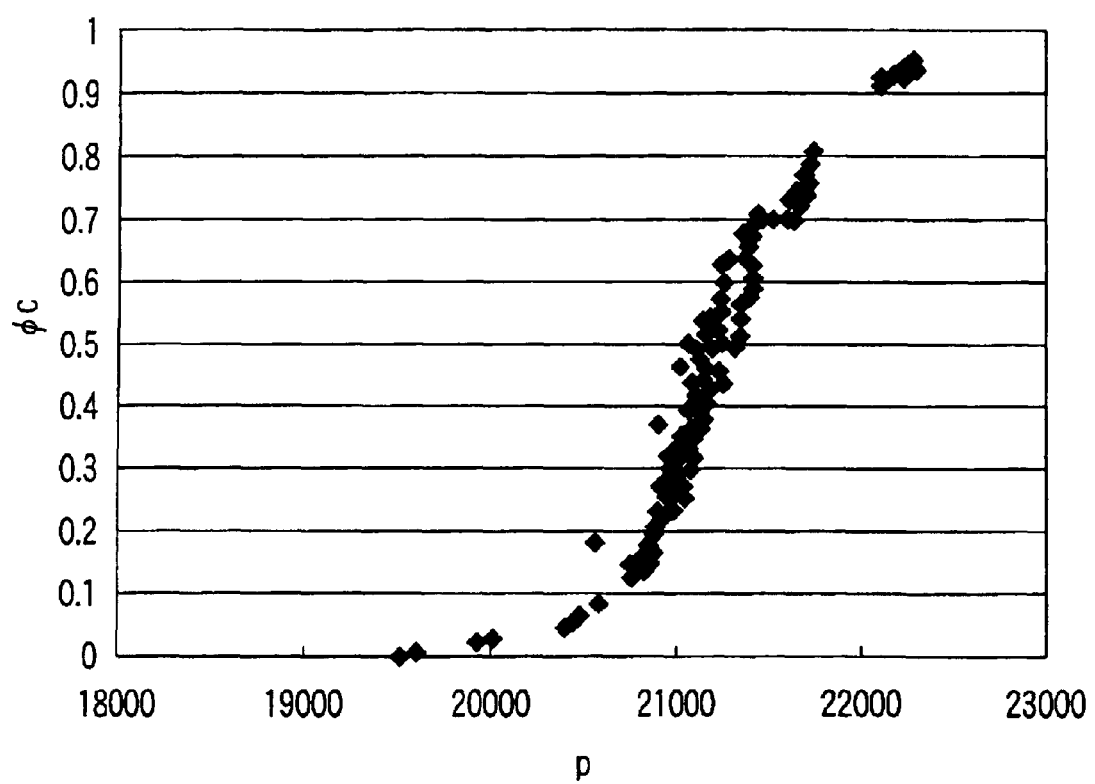
FIG. 2 is a graph showing a relationship between a creep damage degree $\phi$ and the Larson-Miller parameter P.

The stored data of the creep damage degree $\phi c$ has a relationship with the Larson-Miller parameter P as shown in FIG. 2, wherein the creep damage degrees $\phi c$ are plotted in a relation of the Larson-Miller parameter P.

The computational results from the calculation section 3 are retained in the storage section 4 where they are stored for each member and each region. Specifying the name of a member or region allows its associated computational results to be accessed. Thus, the calculation result storage section 4 is stored with combined data of the creep damage degree $\phi c$ and the Larson-Miller parameter P for each of many members and assessment regions.

Next, in the creep damage degree estimation approximation expression calculation section 5, an approximation expression for the creep damage degree $\phi c$ is calculated from expression (5) representing the relationship of the creep damage degree $\phi c$ and the Larson-Miller parameter P for each assessment region of each component. The approximation expression (5) is decided by combined data of the creep damage degree $\phi c$ and the Larson-Miller parameter P stored in the storage section 4 for each assessment region of each individual member. That is, constants A and B in approximation expression (5) are obtained for each region of each member. The creep damage degree $\phi c$ is estimated by approximation expression (5) representing the relationship of P and $\phi c$.

$$\phi c = 1 - exp(A \cdot P^B) \quad (5)$$

where A and B are constants.

Experiments have confirmed that approximation expression (5) is very close to the relationship of the creep damage degree $\phi c$ and the Larson-Miller parameter P_measured actually for members of a steam turbine.

Next, as shown in FIG. 1B, the estimated creep damage degree $\phi c$ is input from the creep damage degree estimation approximation expression calculation section 5 to a system that estimates the probabilistic life. This system is composed of a section 6 for Weibull statistical processing and a calculation section 7 for a probabilistic estimation expression of the creep damage degree $\phi c$.

In the Weibull statistical processing section 6, the estimated creep damage degree $\phi c$ is subjected to Weibull statistical analysis. In the probabilistic estimation expression calculation section 7, the probabilistic life is predicted from the analyses.

Variations in data in the relationship of the creep damage degree $\phi c$ and the Larson-Miller parameter P as a function of the operation time period t(h) and the in-service temperature T(K) can be closely approximated by the Weibull distribution, and the Weibull coefficient m and the scale parameter $\beta$ are calculated through the Weibull statistical analysis.

The creep damage degree probabilistic estimation expression calculation section 7 calculates an expression to estimate probabilistically the creep damage degree $\phi c$ as $$\phi c = \{1 - exp(A \cdot P^B)\} \cdot \{\beta \cdot {}^m\sqrt{\ln(1-Pf)^{-1}}\} \quad (6)$$

Figure 3A:
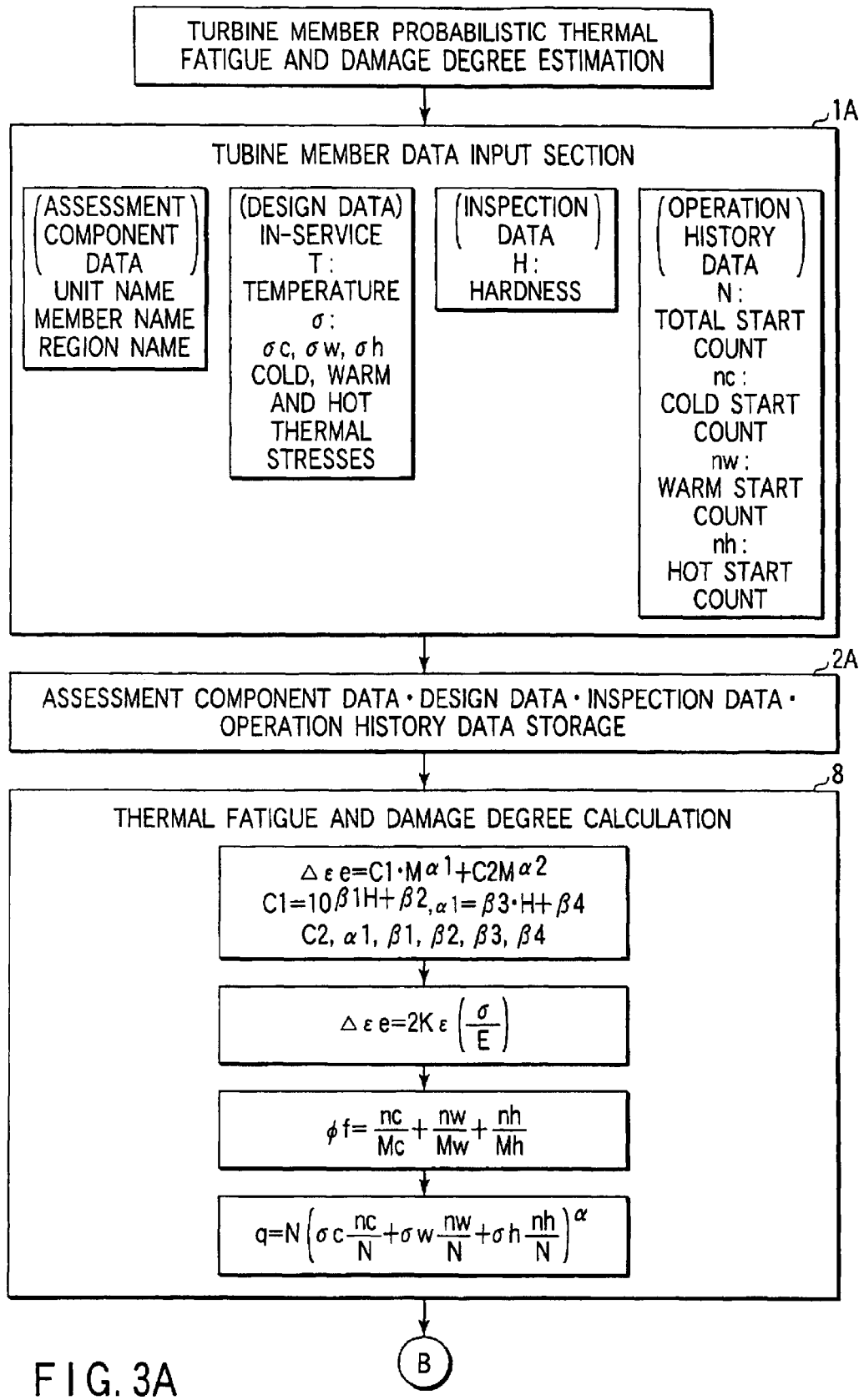
FIGS. 3A and 3B form a block diagram of equipment for assessing the life of a member put under a high in-service temperature environment for a long period based on the thermal fatigue and damage degree in accordance with another embodiment of the present invention.
Figure 3B:
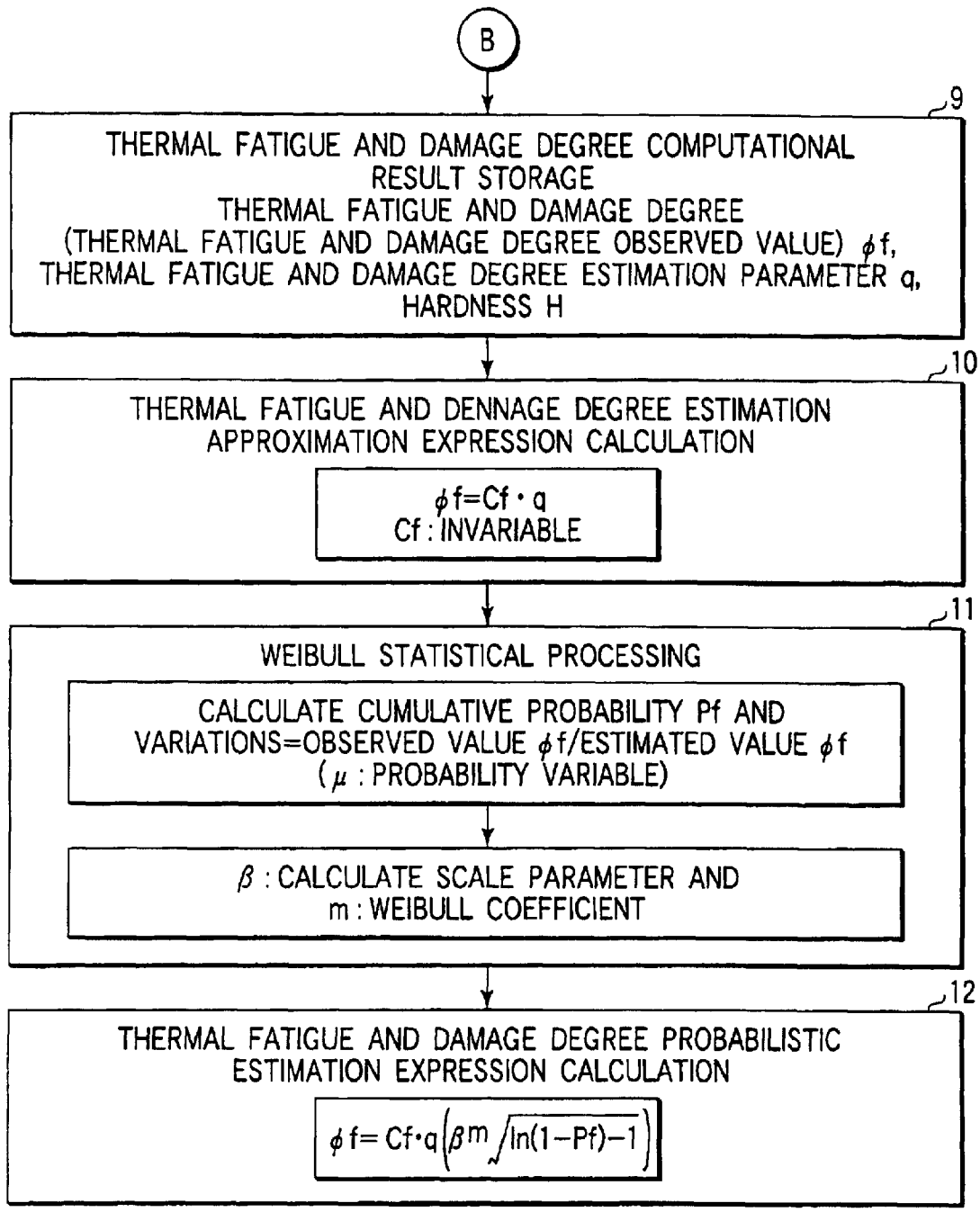

FIGS. 3A and 3B form a block diagram of another embodiment of the equipment for assessing the life of structural members used at a high in-service temperature in accordance with the present invention. In the system shown in FIG. 3A, the probabilistic thermal fatigue and damage degree of a steam turbine member is estimated. This system is composed of a data input section 1A for receiving data concerning a member in a steam turbine, a storage section 2A for storing the input data, a calculation section 8 for calculating the thermal fatigue and damage degree, a storage section 9 for storing the calculated value from the calculation section, and a calculation section 10 for determining an approximation expression for estimating the thermal fatigue and damage degree.

The data concerning a member in the steam turbine entered into the data input section 1A include to-be-assessed component data, design data, inspection data, and operation history data. The to-be-assessed component data includes the unit name, member name, and member region name. The design data includes the in-service temperature T and stress $\sigma$ to which a structural member is subjected. Specifically, the stress includes the cold stress $\sigma c$ at cold start time, for example, at start time after the in-service inspection of the steam turbine, the warm thermal stress $\sigma w$ at warm start time, for example, at the time of start after the weekend stoppage, and the hot thermal stress $\sigma h$ at hot start time, for example, at everyday start time. The inspection data includes the hardness (Vickers hardness) H of the structural member measured at in-service inspection time. The operation history data includes the start count n representing the number of times a start has been made; specifically, the total start count N, the cold start count nc representing the number of cold starts, the warm start count nw representing the number of warm starts, and the hot start count nh representing the number of hot starts.

The storage section 2A is stored with the to-be-assessed component data, the design data, the inspection data, and the operation history data input from the data input section 1A.

The calculation section 8 includes a storage section for pre-storing expressions (7) through (10). In the calculation section, various pieces of data stored in the storage section 2A are put into those expressions, then calculations are carried out in accordance with the expressions to obtain a thermal fatigue and damage degree $\phi f$ (experimental value) and an estimation parameter q for the thermal fatigue and damage degree.

That is, being subjected to stresses repeatedly as the result of the turbine being started and stopped over and over again, a component suffers thermal fatigue and damage, which can be estimated in terms of an elastic strain range $\Delta \epsilon e$. The elastic strain range $\Delta \epsilon e$ is a function of the number, M, of repetitions of start and stop until a component cracks, or raptures and the hardness H of the component and represented by $$\Delta \epsilon e = C_1 M^{\alpha 1} + C_2 M^{\alpha 2} \quad (7)$$

where $C1 = C_1 = 10^{\beta_1 \cdot H + \beta_2}$, $\alpha_1 = \beta_3 \cdot H + \beta_4$, and $C2$, $C_2$, $\alpha_1$, $\beta_1$, $\beta_2$, $\beta_3$, $\beta_4$ are constants.

On the other hand, the elastic strain range $\Delta \epsilon e$ of a region whose life is assessed is a function of strain concentration coefficient K, stress σ, and elastic coefficient E and represented by $$\Delta\epsilon e = 2K\epsilon(\sigma/E) \qquad (8)$$

Therefore, measuring the hardness H of an in-service member and knowing the stress a allow the number M of repetitions of start and stop, until a crack is produced in that member, to be estimated.

For the start count n, there are three patterns: cold start count nc, warm start count nw, and hot start count nh. Expression (9) that accumulates the ratio, n/M, of the start count n to the repetition count M for each start pattern is defined to be the thermal fatigue and damage degree φf.

$$\phi f = nc/Mc + nw/Mw + nh/Mh \qquad (9)$$

On the other hand, even if the total start count N remains unchanged, the thermal fatigue and damage degree φf varies due to a stress resulting from a temperature difference between start and stop times and different start patterns.

Thus, taking the start patterns, the start count and the stresses into account, the thermal fatigue and damage degree estimation parameter q is obtained by $$q = N(\sigma c \cdot nc/N + \sigma w \cdot nw/N + \sigma h \cdot nh/N)^\alpha \qquad (10)$$

where α is a constant, σc is the thermal stress at cold start time, σw is the thermal stress at warm start time, σh is the thermal stress at hot start time, N is the total start count, nc is the cold start count, nw is the warm start count, and nh is the hot start count.

The thermal fatigue and damage degree φf and the thermal fatigue and damage degree estimation parameter q thus calculated are output to the storage section 9. In the storage section 9, therefore, the thermal fatigue and damage degree φf and the thermal fatigue and damage degree estimation parameter q are stored in combination as data for each to-be-assessed region or portion of each of many members.

Figure 4:
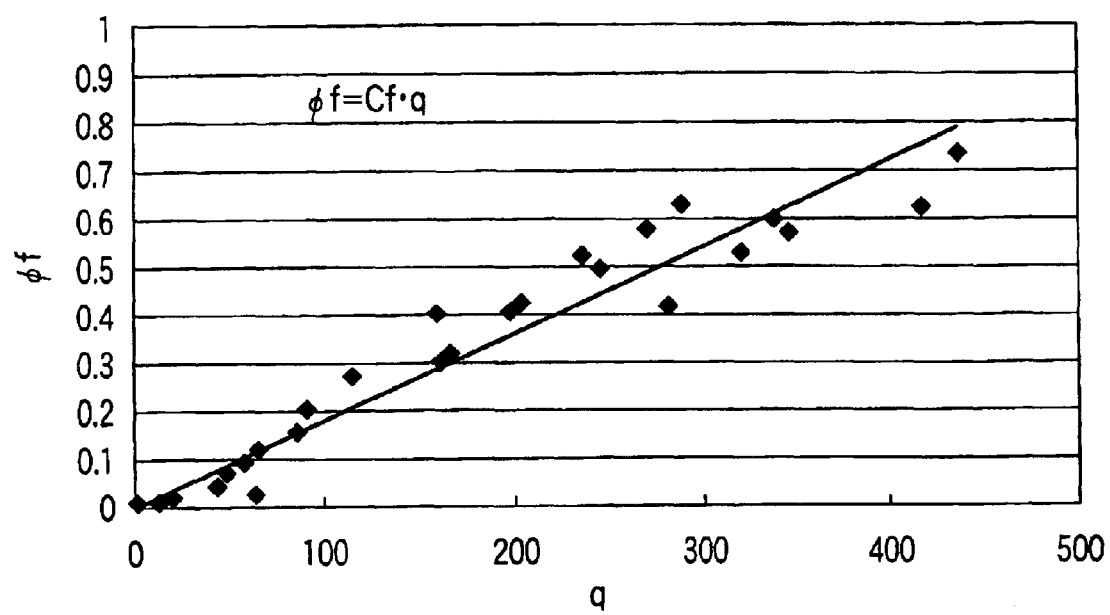
FIG. 4 is graph showing a relation ship between a thermal fatigue and damage degree φf and estimation parameter of the thermal fatigue and damage degree q.

FIG. 4 shows data plots indicating a relationship between the thermal fatigue and damage degree φf and the damage degree estimation parameter q, in which a linear function expressed by an approximation expression (11) explained as follows is also denoted. As apparent from FIG. 4, the data plots can be substantially approximated to the linear function.

In the approximation expression calculation section 10, an approximation expression for the thermal fatigue and damage degree φf is obtained, that indicates the relationship of the thermal fatigue and damage degree φf and the thermal fatigue and damage degree estimation parameter q for each to-be-assessed region of each component. The approximation expression is calculated from combined data of the thermal fatigue and damage degree φf and the thermal fatigue and damage degree estimation parameter q stored in the storage section 4 for each region of each member by expression (11), which represents a constant Cf, estimation parameter q and thermal fatigue and damage degree φf for each component by a linear approximation expression.

$$\phi f = Cf \cdot q \qquad (11)$$

In expression (10) a is obtained for each region of each component, and an appropriate parameter value that most closely approaches expression (11) is calculated.

Next, as shown in FIG. 3B, the probabilistic residual life of the thermal fatigue and damage degree is predicted and analyzed. The system of FIG. 3B is composed of a Weibull statistical processing calculation section 11 for predicting and analyzing the probabilistic residual life of the thermal fatigue and damage degree on the basis of the computational results by the approximation expression calculation section 10 of FIG. 3A and a thermal fatigue and damage degree probabilistic estimation calculation section 12.

The Weibull statistical processing calculation section 11 calculates the Weibull coefficient m and the scale parameter β by Weibull statistical analysis for grasping variations in field data quantitatively as described in connection with FIG. 1B.

The thermal fatigue and damage degree probabilistic estimation calculation section 12 can estimate the thermal fatigue and damage degree φf probabilistically by substituting the Weibull coefficient m and the scale parameter β obtained by the Weibull statistical processing calculation section 11 into the expression $$\phi f = Cf \cdot q(\beta \cdot {}^m\sqrt{\ln(1-Pf)^{-1}}) \qquad (12)$$

where Pf is the cumulative probability (the probability of failure).

Figure 5A:
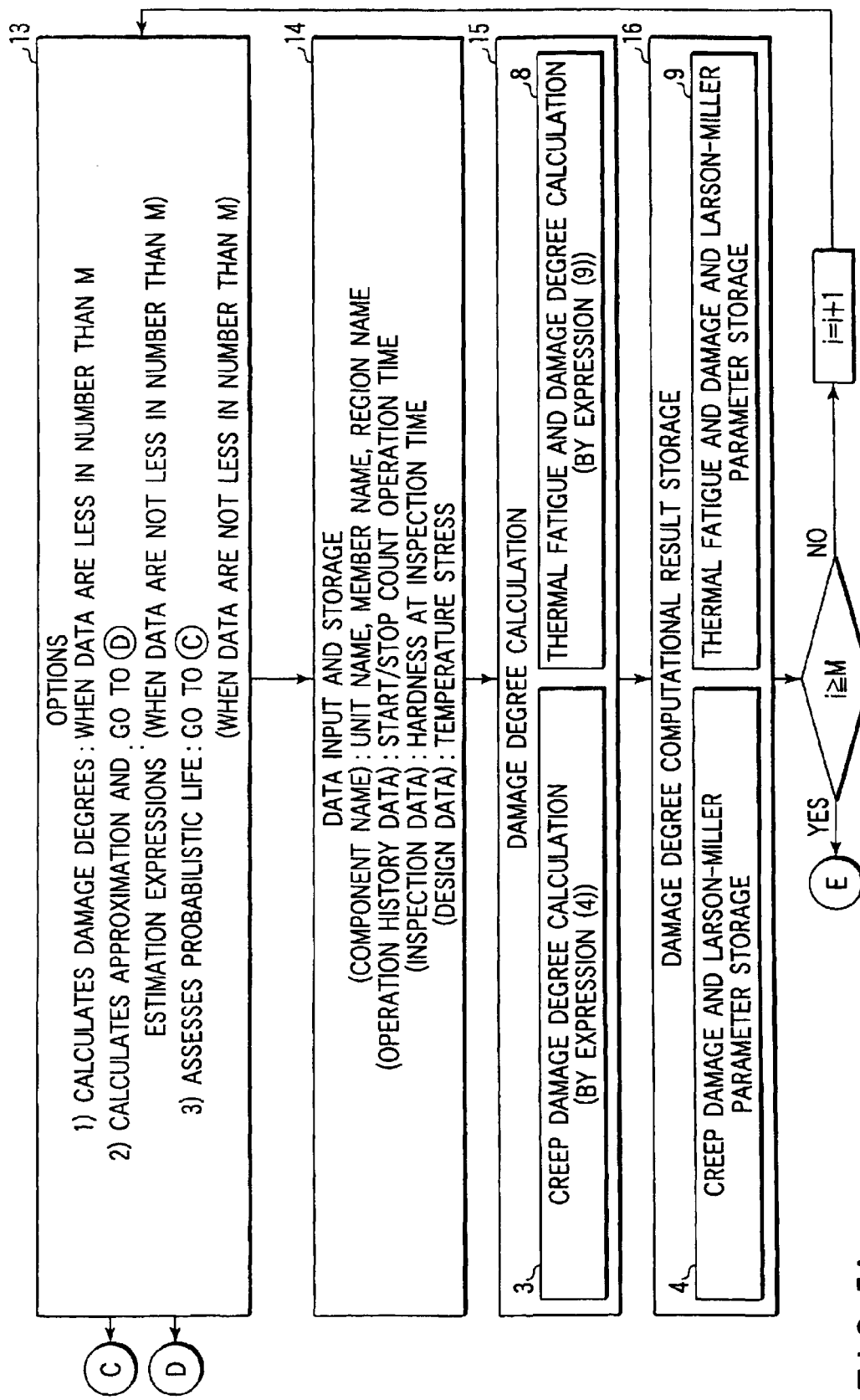
FIGS. 5A to 5C form a block diagram illustrating a more specific embodiment of equipment for assessing the life of a member put under a high in-service temperature environment for a long period in accordance with the present invention.
Figure 5B:
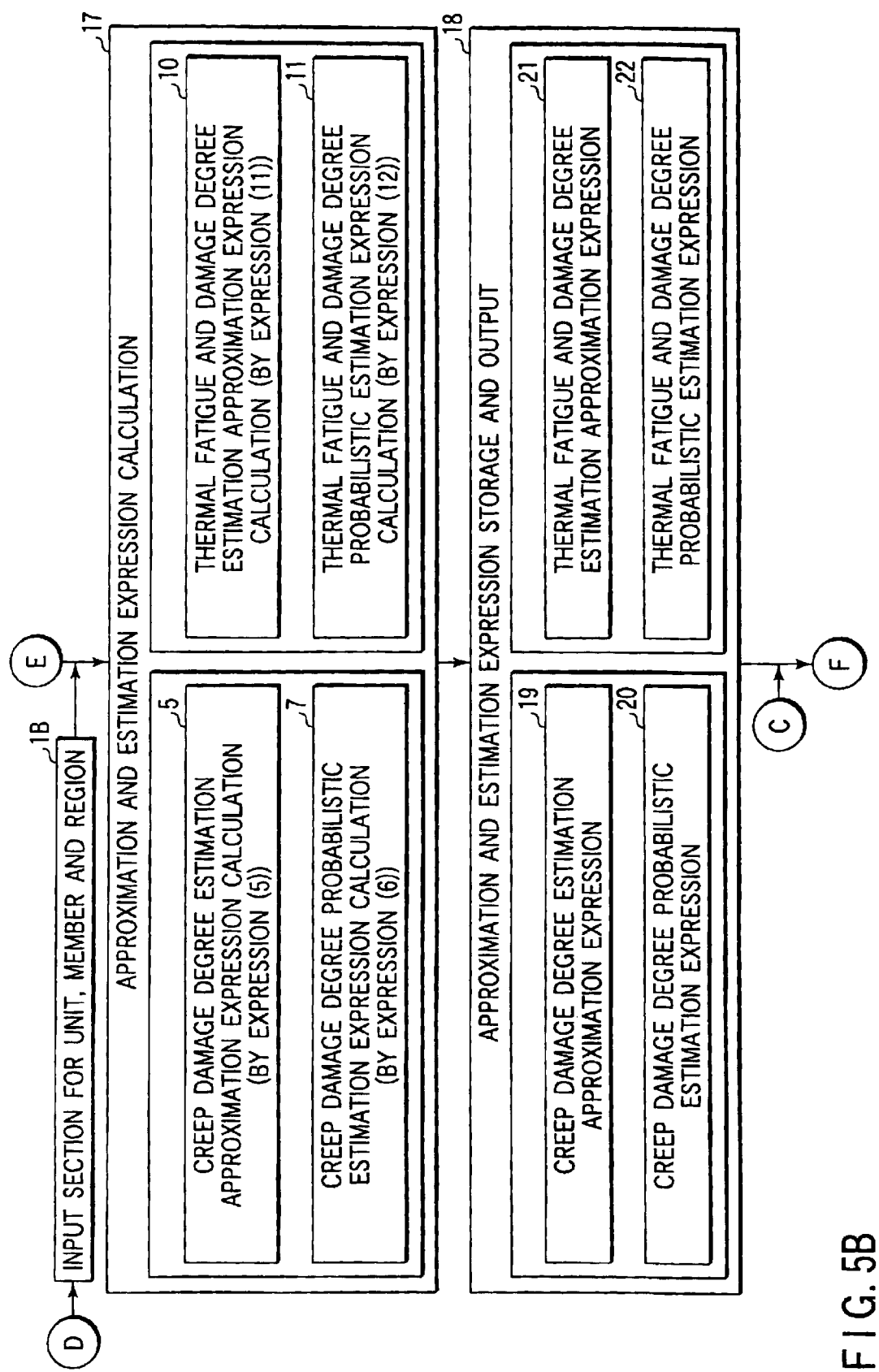
Figure 5C:
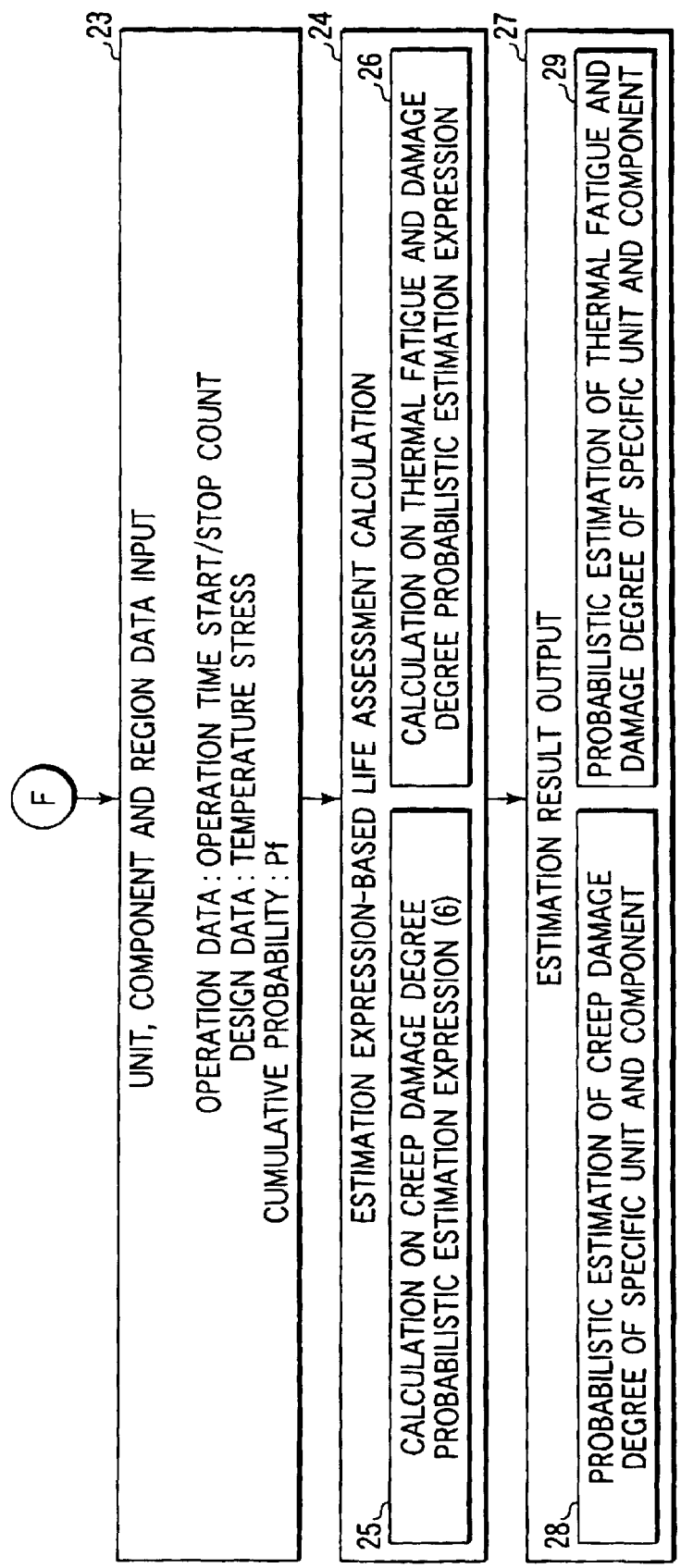

FIGS. 5A to 5C illustrate the function of a system comprising a calculation system that carries out calculations by an estimation expression for estimating the life of a component probabilistically and a device for assessing its life in accordance with the calculations.

FIGS. 5A and 5C show the calculation apparatus that carries out calculations by an estimation expression for estimating the life of a component probabilistically. The calculation system comprises an option section 13 for determining items to be performed, a data input and storage section 14 for inputting necessary data and storing it, a damage degree calculation section 15 for calculating the damage degree, a storage section 16 for storing the calculation of the damage degree, an input section 1B for inputting information about the object of assessment, a calculation section 17 for calculating approximation and estimation expressions on the basis of data from the storage section 16, and a storage and output section 18 for storing the approximation and estimation expressions.

The option section 13 can selectively perform the following;
1) Calculates the creep damage degree and the thermal fatigue and damage degree and stores the results in the storage section;
2) Obtains the approximation expression for estimating the creep damage and the expression for estimating probabilistically the creep damage degree on calculations and obtains the approximation expression for estimating the thermal fatigue and damage degree and the expression for estimating probabilistically the thermal fatigue and damage degree on calculations;
3) Assesses the life probabilistically. A selection can be made among these options through select buttons (not shown) by way of example.

In the input and storage section 14, component data, operation history data, inspection data, and design data are input and stored. The component data includes unit name, member name, region name, etc. The operation data includes start/stop count, operation time, etc. The inspection data includes the hardness of a member, etc. The design data includes temperature, stress, etc.

The damage degree calculation section 15 calculates the creep damage degree φc based on expression (4) and the thermal fatigue and damage degree φf based on expression (9) and stores the results in the storage section 16.

In the input section 1B, data for a member or region for which approximation and estimation expressions are to be obtained is entered and the object of estimation is identified. In the calculation section 17, if M or more pieces of data have been obtained as the calculations of the damage degree of the identified member and region, the approximation expression for estimating the creep damage and the expression for estimating probabilistically the creep damage degree are calculated. Also, in the calculation section 17, the approximation expression for estimating the thermal fatigue and damage degree and the expression for estimating probabilistically the thermal fatigue and damage degree are calculated likewise. In the storage and output section 18, these expressions are stored and then output as required.

Next, a life assessment apparatus will be described with reference to FIG. 5C. The apparatus is composed of an estimation unit, component and region data input section 23, a calculation section 24 for life assessment based on estimation expressions, and an output section 27 for outputting the results of assessment.

In the data input section 23, data necessary for assessment, such as assessment unit, member, operation time, start/stop count, temperature, stress, and cumulative probability Pf, are input.

In the calculation section 24, the creep damage degree probabilistic estimation and the thermal fatigue and damage probabilistic estimation are performed, and in the output section 27 the results of estimation are output.

Figure 6:
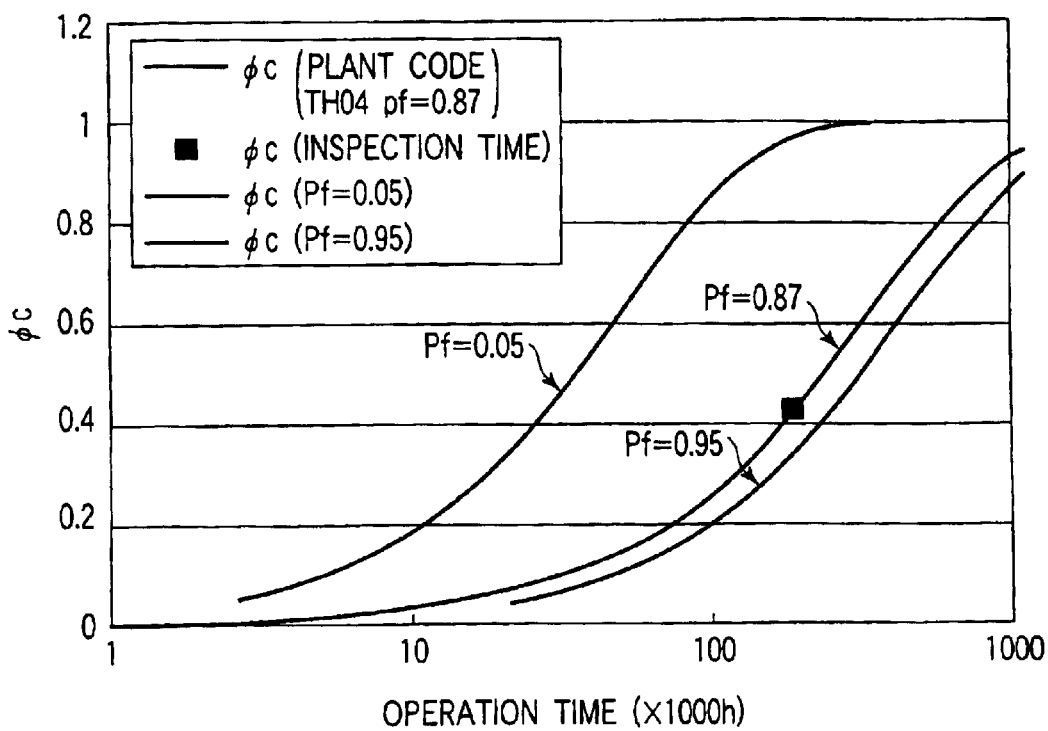
FIG. 6 is a graph showing the results of assessment of the stochastic creep damage degree of a turbine member obtained by steam turbine member's life assessment equipment of the present invention.
Figure 7:
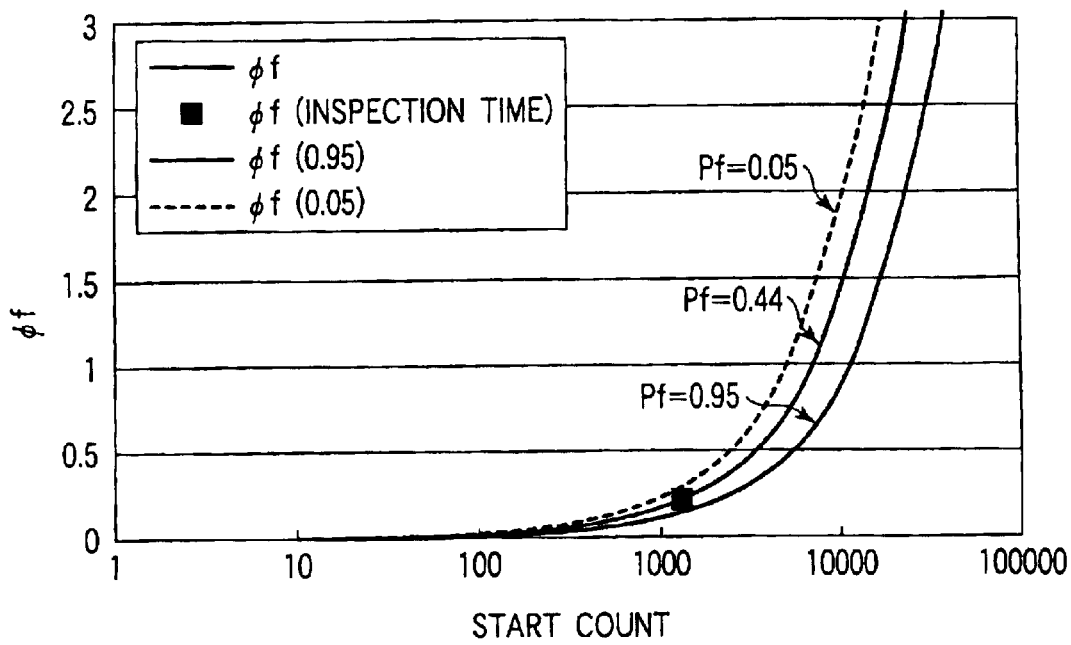
FIG. 7 is a graph showing the results of assessment of the stochastic thermal fatigue and damage degree of a turbine member obtained by steam turbine member's life assessment equipment of the present invention.

FIG. 6 shows the exemplary results of probabilistic estimation of the creep damage degree $\phi c$ of a turbine member by a steam turbine member life assessment device. FIG. 7 shows the exemplary results of probabilistic estimation of the thermal fatigue and damage degree $\phi f$. FIG. 6 plots the probabilistically estimated creep damage degree $\phi c$ of a member of a steam turbine against the operation time for cumulative probability Pf=0.05, 0.87 and 0.95. In FIG. 7, the probabilistically estimated thermal fatigue and damage degree $\phi f$ of the steam turbine member is plotted against the start count of the steam turbine unit for cumulative probability Pf=0.05, 0.44 and 0.95.

The curves of FIGS. 6 and 7 confirm that, if the creep damage degree $\phi c$ and the thermal fatigue and damage degree $\phi f$ are delivered from the hardness which is measured at in-service inspection time and the cumulative probability Pf=0.87 and 0.44 are determined from the equations (6) and (12), the residual life can probabilistically be predicted with precision based on the creep damage degree $\phi c$ and the thermal fatigue and damage degree $\phi f$ for each component of the steam turbine.

In this way, according to the equipment of this embodiment, the process of consumption of the life can be simulated for any cumulative probability Pf.

The above embodiment of the present invention has been described in terms of the rotor of a steam turbine as a structural member used at a high in-service temperature. This is not restrictive. The principles of the present invention can be applied to any other structural member used at high in-service temperatures.

Another embodiment of the present invention will be described with reference to FIGS. 8 to 13.

Figure 8:
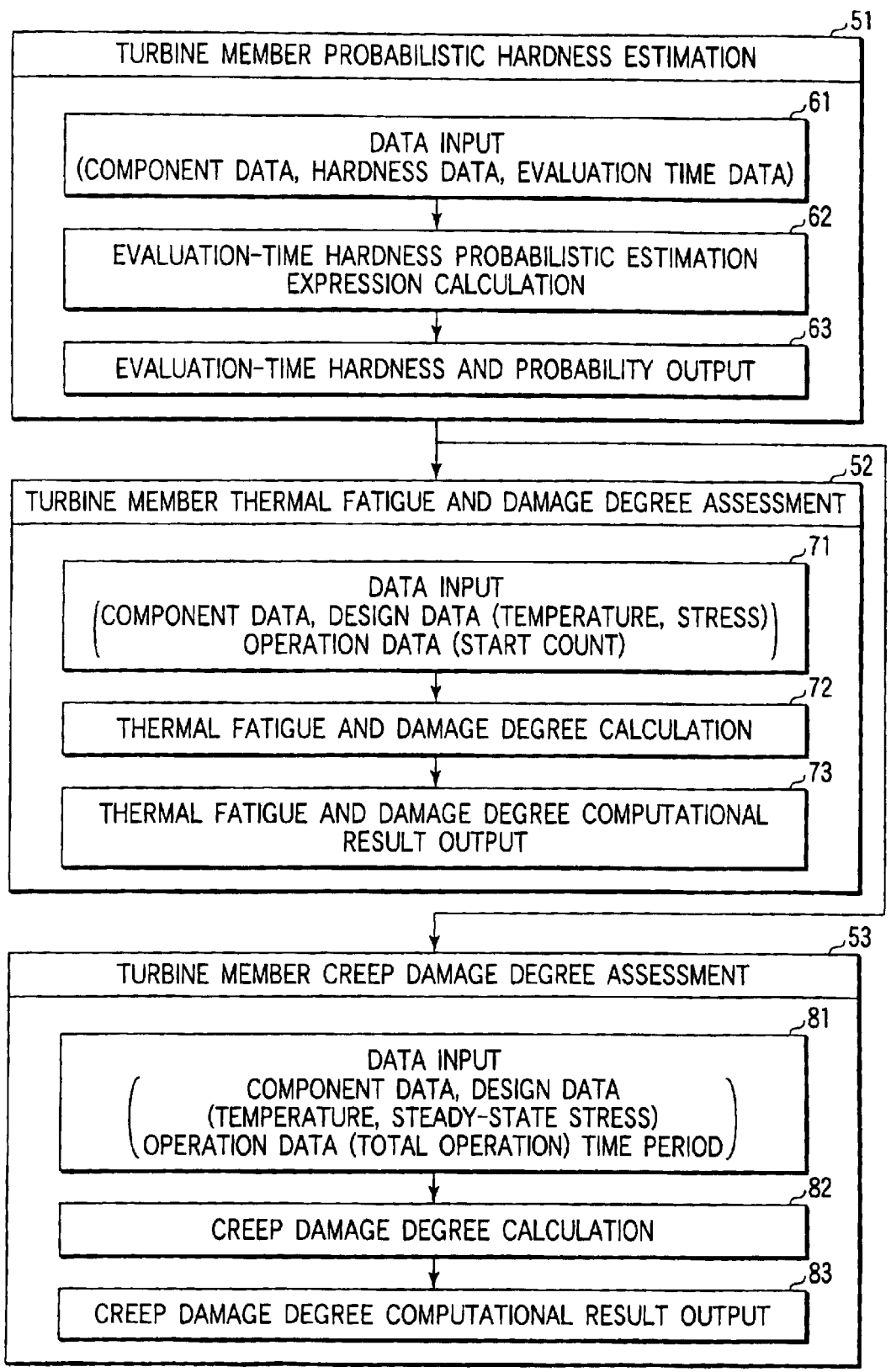
FIG. 8 is a block diagram of a modification of the equipment for assessing the life of a member put under a high in-service temperature environment for a long period in accordance with the present invention.

FIG. 8 shows equipment for assessing the life of a member. This life assessment equipment comprises an estimation section 51 for estimating probabilistically the hardness of a turbine member subjected to a high in-service temperature, an assessment or estimation section 52 for estimating or assessing the thermal fatigue and damage degree of the turbine member, and an assessment section 53 for assessing the creep damage degree of the turbine member.

The estimation section 51 comprises a data input section 61 for inputting data concerning a member, a calculation section 62 for executing calculations in accordance with an expression that estimates the hardness of the member on the basis of the input data, and an output section 63 for outputting the results from the calculation section 62. In the estimation section 51, the hardness of the turbine member at any time can be estimated on the basis of the Weibull statistical analysis-based probabilistic estimation expression as will be described later.

The estimation section 52 comprises a data input section 71 for inputting data concerning a member, a calculation section 72 for calculating the thermal fatigue and damage degree on the basis of the input data, and an output section 73 for outputting the results from the calculation section 72. In the estimation section 52, the thermal fatigue and damage degree is estimated, or evaluated from the estimated value for hardness from the section 51, and the thermal stress, the temperature and the start count of the turbine member The estimation section 53 comprises a data input section 81 for inputting data concerning a member, a calculation section 82 for calculating the creep damage degree, and an output section 33 for outputting the results from the calculation section 82. In the estimation section 53, the creep damage degree is estimated, or evaluated from the estimated value for hardness from the section 51, and the steady-state stress, the temperature and the operation time of the turbine member on the basis of cumulative damage rules.

Figure 9:
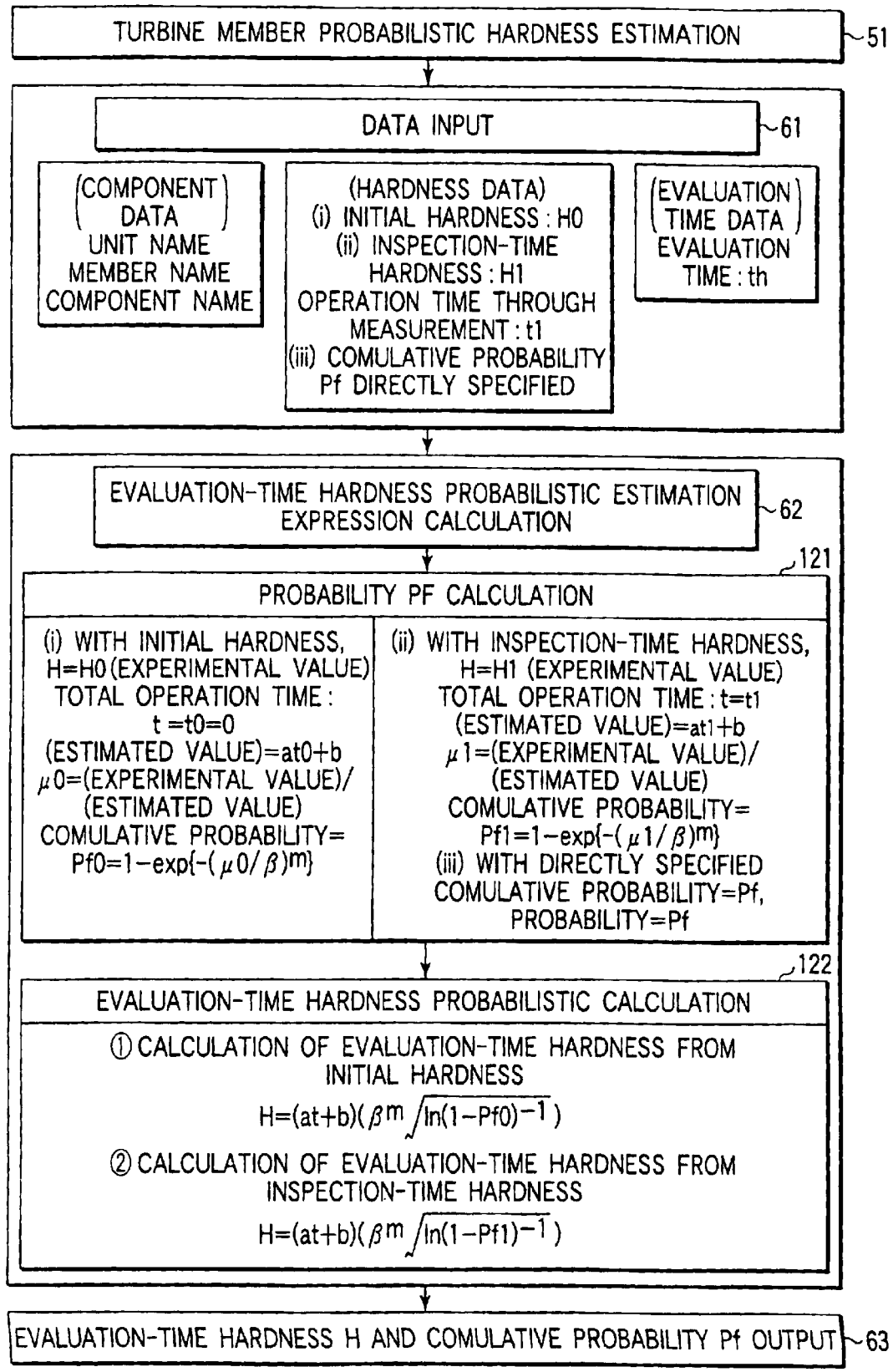
FIG. 9 is a detailed block diagram of the section for estimating the stochastic hardness of the turbine member shown in FIG. 8.

In FIG. 9, the hardness estimation section 51 is illustrated in detail. As shown in FIG. 9, in the turbine member's life assessment equipment, time-varying hardness data is stored over a long period of time, say, fifteen years. The hardness of the turbine member is estimated probabilistically by subjecting the hardness data to Weibull statistical analysis.

Figure 10:
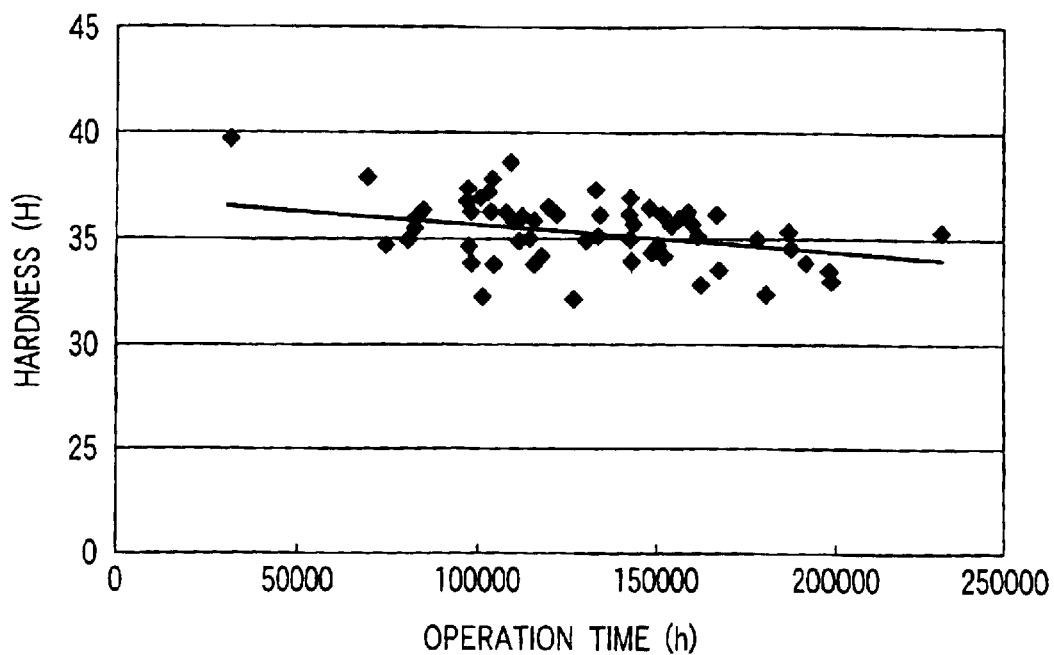
FIG. 10 is a characteristic diagram showing the relationship of operating time and hardness for use in explanation of calculations in the section for estimating the stochastic hardness of the turbine member shown in FIG. 8.

A piece of each member is prepared at manufacture time. Its initial hardness at manufacture time and the subsequent hardness are examined. The hardness H is plotted against the operation time t as shown in FIG. 10. It has been found that the plot of FIG. 10 can be approximated by a linear function as indicated by expression (33). In FIG. 10, the hardness H is represented in terms of Vickers hardness. Any other unit instead of the Vickers hardness may represent the hardness. In this case as well, the data plot of FIG. 10 can be made to approximate to expression (33).

$$H = at + b \tag{33}$$

Figure 11:
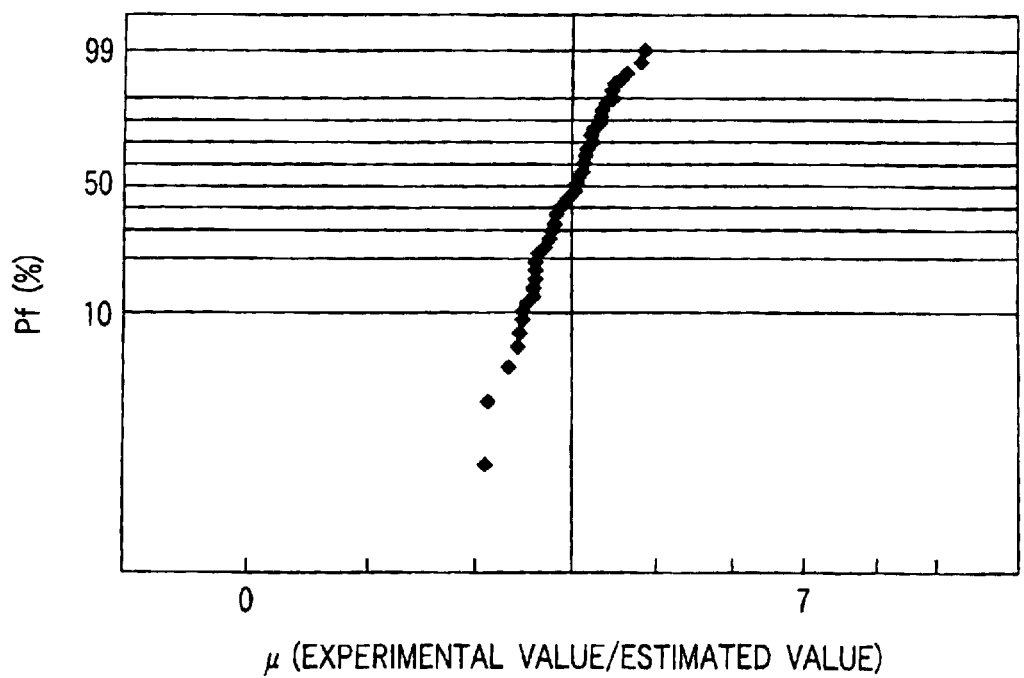
FIG. 11 is a characteristic diagram showing variations in data in the relationship of operating time and hardness for use in explanation of calculations in the estimation of the stochastic hardness of the turbine member shown in FIG. 8.

Also, it has been found that variations ($\mu$=experimental value/estimated value) in data in the relationship of the operation time and the hardness can be made to approximate closely to the Weibull distribution as shown in FIG. 11. The Weibull coefficient and the scale parameter can therefore be determined from variations in data and the hardness H can be estimated probabilistically by $$H = (at+b)(\beta \cdot {}^m\sqrt{\ln(1-Pf)^{-1}}) \tag{34}$$

In the data input section 51 shown in FIG. 9, evaluation component data, hardness data and evaluation time data are input. Data concerning a component to be evaluated include the name of a unit into which the component is incorporated (e.g., a steam turbine unit), the name of a member for identifying the material of the component, and the name of the component. For the hardness data, (i) when initial hardness is input, the initial hardness H0 is input, (ii) when the hardness at n-service inspection time is input, the operation time t1 through hardness measurement at in-service inspection time and the hardness H1 are input, and (iii) when a cumulative probability Pf is directly specified, an appropriate cumulative probability Pf is input. For the evaluation time data, an evaluation time th through the time of evaluation is input.

Further, in the calculation section 62 shown in FIG. 9, the hardness at evaluation time is estimated probabilistically by the estimation expression as follows. That is, taking variations in the hardness of a member according to its material characteristics into account, cumulative probabilities Pf corresponding to the initial hardness and the hardness at in-service inspection time are calculated in the calculation section 121 as follow:

(i) When the initial hardness is input, the cumulative probability Pf0 corresponding to the initial hardness is determined by $$Pf0 = 1 - exp\{-(\mu 0/\beta)^m\} \qquad (35)$$

where H is the member's hardness, t is the member's total operation time, a and b are constants, m is the Weibull coefficient, $\beta$ is the scale parameter, Pf is the cumulative probability corresponding to the initial hardness of the member, and $\mu 0$ is initial hardness (experimental value)/hardness (estimated value).

Here, initial hardness (experimental value)=H0 total operation time: t=t0=0 hardness of the member H=a t0+b=b (ii) When the hardness at in-service inspection time is input, the corresponding cumulative probability is determined by $$Pf1 = 1 - exp\{-(\mu 1/\beta)^m\} \qquad (36)$$

where $\mu 1$ is hardness at in-service inspection time (experimental value)/hardness (estimated value).

Here, hardness at in-service inspection time (experimental value)=H1 total operation time: t=t1 hardness of the member H=a t0+b=b (iii) When Pf is directly specified, the hardness can be estimated utilizing the specified Pf and the evaluation time t.

Next, in the hardness calculation section 122, the hardness at evaluation time is calculated using the probabilities Pf0 and Pf1 calculated by the calculation section 121 or the directly specified Pf and the total operation time t at evaluation time.

The hardness as the calculation result at the evaluation time and the cumulative probability Pf corresponding to the hardness at the evaluation time is output from the output section 63 shown in FIG. 9.

Figure 12:
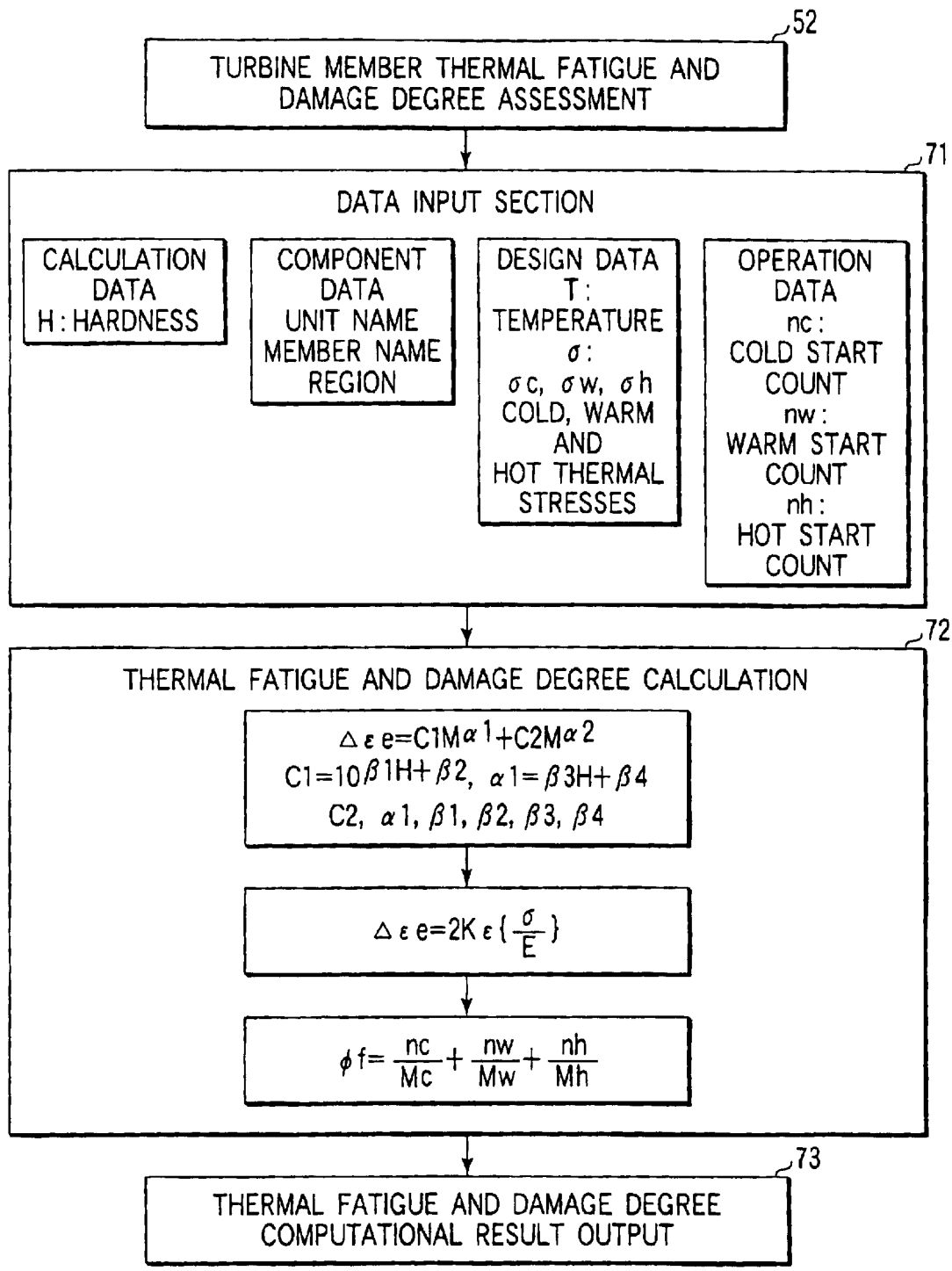
FIG. 12 is a block diagram of the section for assessing the thermal fatigue and damage of the turbine member shown in FIG. 8.

FIG. 12 shows the details of the turbine member thermal fatigue and damage degree assessment section 52. In the data input section 71, input data include calculation data, component data, design data, and operation data (operation history data). The calculation data is the hardness of a turbine member (corresponding to the output of the member hardness estimation section 1). The component data includes the unit name, member name, and region name. The design data includes the temperature T, the thermal stress σc at cold start time, the thermal stress σw at warm start time, the thermal stress σh at hot start time, and the generic thermal stress σ for these stresses. The operation data includes the total start count N, the cold start count nc, the warm start count nw, and the hot start count nh.

In the calculation section 72 shown in FIG. 12, the thermal fatigue and damage degree is calculated from the input data from the data input section 61 and the hardness H at evaluation time estimated by the hardness estimation section 51.

The thermal fatigue and damage degree of the member resulting from being subjected to repeated stresses due to the start and stop of the turbine can estimate the strain range $\Delta\epsilon e$ from a function of the number of repetitions N through the generation of a crack and the hardness H as a low-cycle fatigue characteristic by $$\Delta\epsilon e = C1M^{\alpha 1} + C2M^{\alpha 2} \qquad (37)$$

The strain range of $\Delta\epsilon e$ of a life evaluation region is represented as a function of the strain concentration coefficient $K\epsilon$, the stress a and the elastic coefficient E as follows:

$$\Delta\epsilon e = 2K\epsilon(\sigma/E) \qquad (38)$$

Therefore, knowing the stress σ allows the number of repetitions (the number of occurrences of rupture) M until cracking occurs in the turbine member to be estimated using the hardness H at evaluation time obtained by the hardness estimation section 51.

For the start count n, there are three patterns: cold start count nc, warm start count nw, and hot start count nh. The accumulation of the ratio, n/M, of the start count n to the repetition count M through the time of occurrence of cracking for each start pattern is defined to be the thermal fatigue and damage degree $\phi f$ as follows:

$$\phi f = nc/Mc + nw/Mw + nh/Mh \qquad (39)$$

Here, $C_1 = 10^{\beta 1 H + \beta 2}$, $\alpha_1 = \beta_3 \cdot H + \beta_4$, and $C_2, \alpha_1, \beta_1, \beta_2, \beta_3, \beta_4$ are constants, $\Delta\epsilon e$ is the strain range of the life assessment region, K is the strain concentration coefficient, σ is the stress, M is the number of repetitions through the time of occurrence of cracking, E is the elastic coefficient, nc is the cold start count, nw is the warm start count, nh is the hot start count, Mc is the number of repetitions through the time of occurrence of cracking at the cold start time, Mw is the number of repetitions through the time of occurrence of cracking at the cold start time, Mh is the number of repetitions through the time of occurrence of cracking at the hot start time, and $\phi f$ is the thermal fatigue and damage degree.

Figure 13:
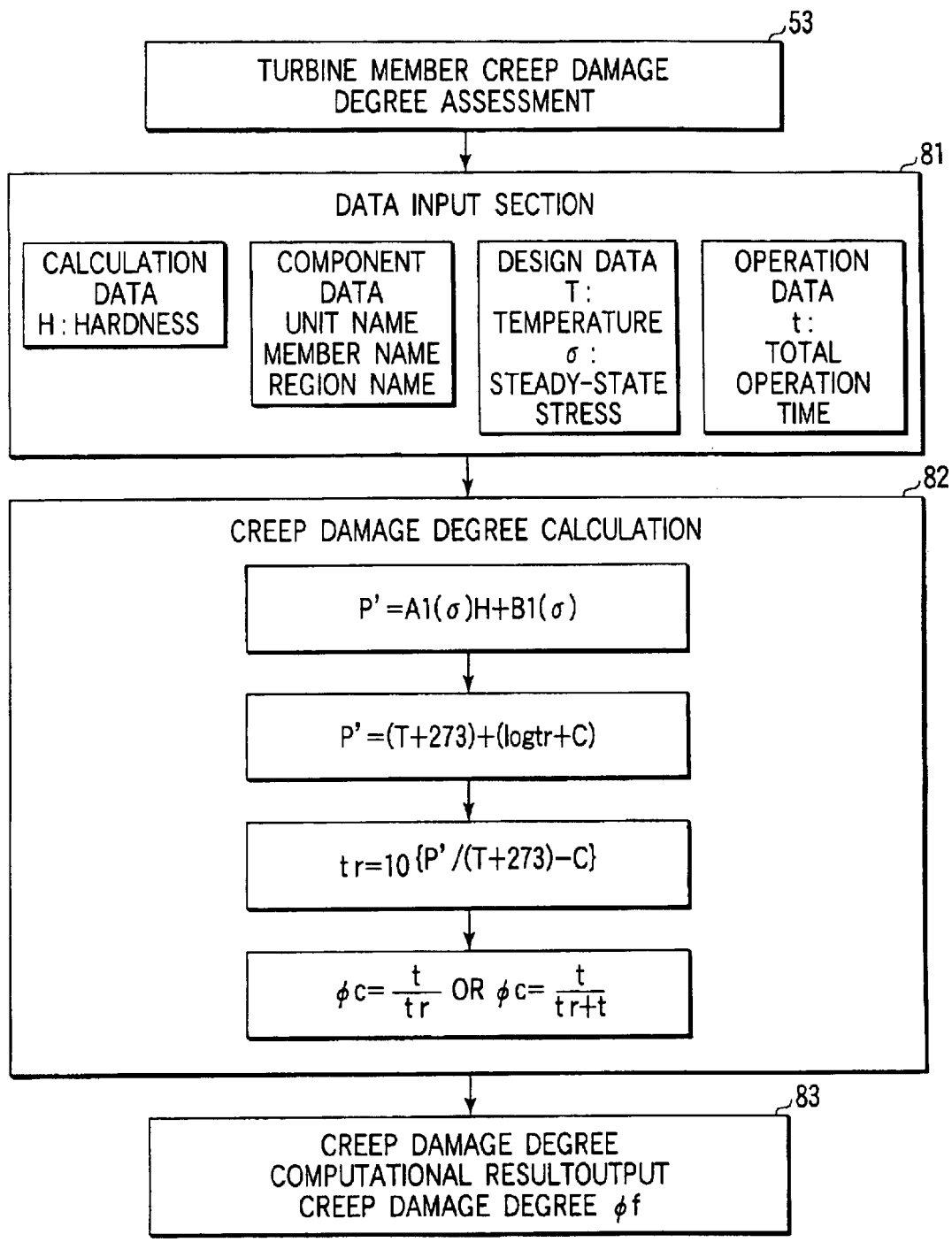
FIG. 13 is a block diagram of the means for assessing the creep damage of the turbine member shown in FIG. 8.

FIG. 13 shows the details of the turbine member creep rupture and damage degree assessment section 53. In the data input section 81, input data include calculation data, component data, design data, and operation data (operation history data). The calculation data is the hardness of a turbine member (corresponding to the output of the member hardness estimation section 51). The component data includes the unit name, member name, and region name. The design data includes the temperature T of the turbine member in the steady state, the steady-state stress σ. The operation data includes the total operation time t.

In the estimation section 82 shown in FIG. 13, the creep damage degree is calculated from the input data from the data input section 81 and the hardness H at evaluation time from the hardness estimation section 51. Specifically, the creep damage degree is estimated (calculated) based on expressions (40) through (43).

The creep damage degree due to steady-state operation under conditions of a high in-service temperature and a constant stress allows the LarsonMiller parameter P to be estimated from the hardness H and the steady-state stress (load stress) by $$P' = A1(\sigma)H + B1(\sigma) \quad (40)$$

On the other hand, the Larson-Miller parameter p is represented, as a function of the in-service temperature T(° C.) and the creep rupture life tr, by $$tr = 10^{\{P'/(T+273)-C\}} \quad (41)$$

where C is the material constant, T is the in-service temperature, and tr is creep rupture life, $$\phi c = t/(tr+t) \text{ or } \phi c = t/tr \quad (42)$$

where φc is the creep damage degree, and where, when data of the hardness of the portion under a high in-service temperature and a high stress of the member whose life is to be assessed is used, φc=t/(tr+t) is employed, and when data of the hardness of the portion under a high in-service temperature and a low stress is used to assess the portion of the member under a high in-service temperature and a high stress, φc=t/tr is employed.

The estimation result of the creep damage degree is output from the output section 83 of FIG. 13.

In the calculation section 121 of FIG. 9, the cumulative probability Pf obtained from the hardness of a member at any point of time can be estimated on the basis of the probabilistic estimation expression based on the Weibull statistical analysis; this cumulative probability Pf may be input, as inspection data, to the input section 23 shown in FIG. 5C to estimate the creep damage degree in the system of FIGS. 5A to 5C.

Furthermore, in the calculation section 121, the cumulative probability Pf can be estimated. This cumulative probability Pf may be used to estimate the creep damage degree. That is, the cumulative probability Pf may be so inputted to the input section 23 shown in FIG. 5C as to estimate the creep damage degree. The hardness H obtained from the cumulative probability Pf may be also so input to the input section 1A shown in FIG. 1A to estimate the thermal fatigue and damage degree. That is, the cumulative probability may be utilized to estimate the thermal fatigue and damage degree.

As apparent from the description, the above described method and system are realized by a computer system comprising CPU, ROM, RAM and I/F and a computer program for the computer system is so designed as to perform the above described method.

Figure 14:
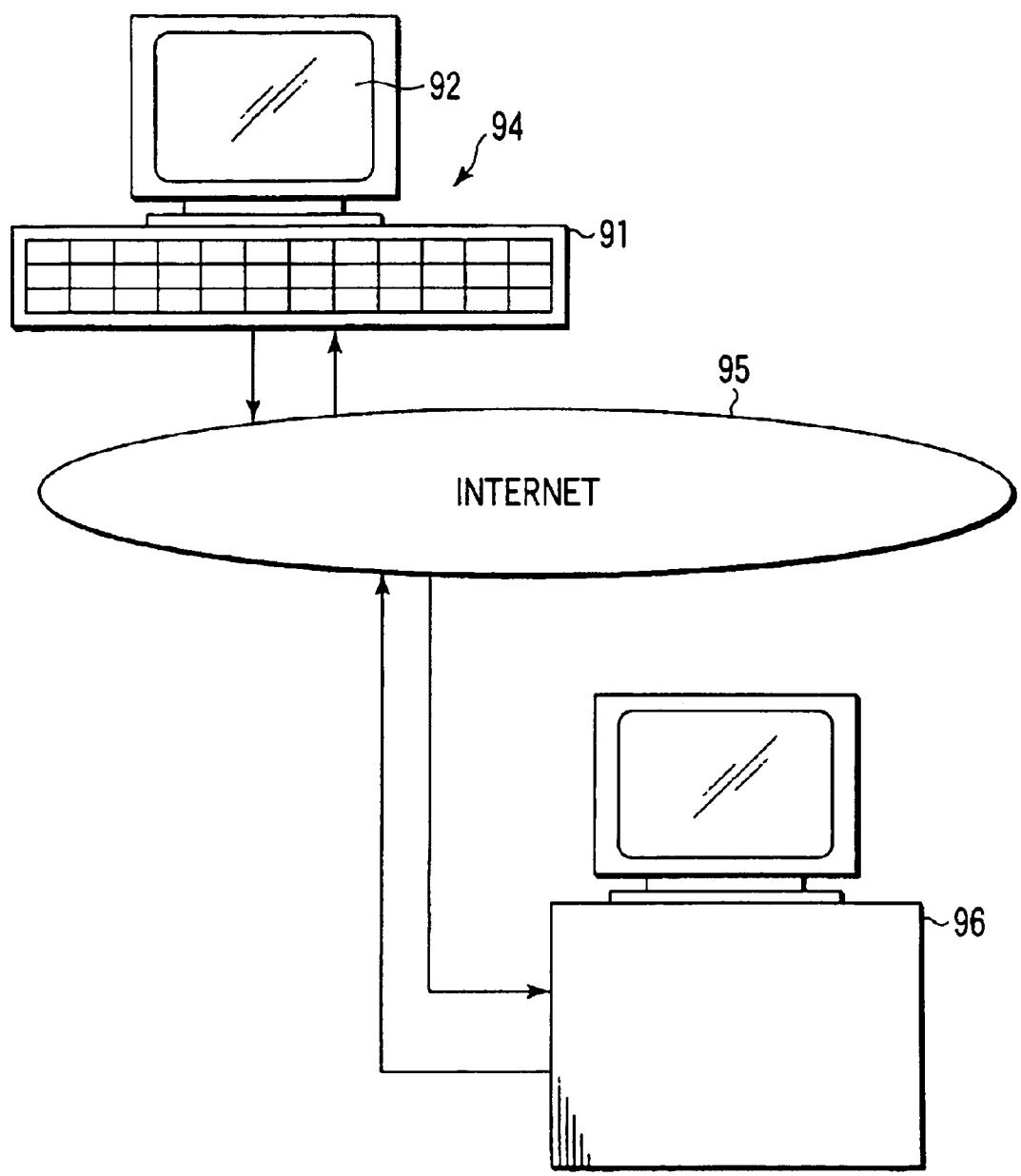
FIG. 14 is a schematic illustration of a system adapted to transmit the results of assessment by the life assessment method and equipment shown in FIG. 8 over the Internet.

FIG. 14 illustrates a method of assessing the life of a turbine member over a network, for example, an internet 95. With the system of FIG. 14, a server 96 can provide a service over the internet 95 to a client who desires to assess the life of a member consisting of low alloy steel. That is, in the system that assesses the life of a member, a terminal 94 on the client side includes an input section 91 and an output section 92 and the service providing server 96 includes an estimation section that estimates the creep damage degree and the thermal fatigue and damage degree which have already been described. The external input section 91 is allowed to, as instructed by the server, enter the unit name, the component name, the hardness, the operation time at the time of hardness measurement or the cumulative probability Pf, and the operation time and the start/stop count through the time of evaluation. The estimation section receives those input data over the internet 95 and then estimates the creep damage degree and the thermal fatigue and damage degree. The output section 92 on the client side receives the results of estimation over the internet 95 from the estimation and outputs them.

The external input section 91 is simply a device that inputs commands and data to a computer such as a personal computer, for instance, a keyboard, a mouse, a tablet, a joystick, a scanner, an OCR, a character recognition system, a voice input system, a video system, a bar-code reader, or a microphone. The output section 92 may be any device capable of outputting computer-processed information, such as a printer, a visual display unit, a voice output system, etc.

The service providing server 96 consists of an information processing terminal, such as a computer, and has server functions for the internet 95. The internet may be either wired or wireless provided that it can make digital communications. The internet may contain public lines.

In the internet system as shown in FIG. 14, following methods can be realized. That is, the system can perform a method of assessing the life of a member subjected to a high in-service temperature for a long period comprising the steps of:

determining a Larson-Miller parameter for the member whose life is to be assessed from the in-service temperature and time of the member and using data established by calculating the creep damage degree on the basis of cumulative damage rules from the hardness and stress of the member to approximate the relationship between the Larson-Miller parameter and the creep damage degree by an expression including an exponential function;

prompting a terminal connected through a network to input the in-service time period, of the member whose life is to be assessed;

assessing the life of the member from the in-service time period, of the member whose life is to be assessed by using the approximate expression; and outputting the assessed life to the terminal.

The system can also perform a method of assessing the life of a member subjected to a high in-service temperature for a long period comprising the steps of:

determining a Larson-Miller parameter for the member whose life is to be assessed from the in-service temperature and service time period during which the member is used in-service temperature and using data established by calculating the creep damage degree on the basis of cumulative damage rules from the hardness and stress of the member to approximate the relationship between the Larson-Miller parameter and the creep damage degree by an expression including an exponential function and further to prepare an expression estimating the creep damage degree added with probabilistic statistical processing;

prompting a terminal connected through a network to input the in-service time period, and the hardness of the member whose life is to be assessed;

assessing the life of the member from the in-service time period, of the input member; and outputting the assessed life to the terminal.

Furthermore, the system can perform a method of assessing the life of a member subjected to a high in-service temperature for a long period comprising the steps of:

inputting a service time period during which the member is used in-service temperature, whose life is to be assessed from a terminal connected to a network; and according to the input, in a service supplying equipment connected to the network, determining a Larson-Miller parameter for the member whose life is to be assessed from the in-service temperature and service time period during which the member is used in-service temperature, assessing the life of the member by the approximate expression including an exponential function of the relationship between the Larson-Miller parameter and the creep damage degree using data established by calculating the creep damage degree on the basis of cumulative damage rules from the hardness and stress of the member, and outputting the assessed life to the terminal.

Furthermore, the system can also perform a method of assessing the life of a member subjected to a high in-service temperature for a long period comprising the steps of:

inputting a service time period during which the member is used in-service temperature and the hardness of the member whose life is to be assessed from a terminal connected to a network; and according to the input, in a service supplying equipment connected to the network, determining a Larson-Miller parameter for the member whose life is to be assessed from the in-service temperature and time of the member, using data established by calculating the creep damage degree on the basis of cumulative damage rules from the hardness and stress of the member to approximate the relationship between the Larson-Miller parameter and the creep damage degree by an expression including an exponential function and to assess the life of the member by an expression estimating the creep damage degree added with probabilistic statistical processing, and outputting the assessed life to the terminal.

The system can also perform an another method of assessing the life of a member provided in an apparatus which is started and stopped over and over again and subjected to a high in-service temperature for a long period while the apparatus is being operated comprising the steps of:

from an estimation parameter which is a function of a set of the start count and stress, and data established by calculating thermal fatigue and damage degree based on cumulative damage rules for the member whose life is to be assessed, preparing an approximate expression of the relationship between the estimation parameter and the thermal fatigue and damage degree;

prompting a terminal connected through a network to input the start count of the member whose life is to be assessed;

assessing the life of the member from the input start count by using the approximate expression; and outputting the assessed life to the terminal.

The system can also perform a yet another method of assessing the life of a member provided in an apparatus which is started and stopped over and over again and subjected to a high in-service temperature for a long period while the apparatus is being operated comprising the steps of:

using an estimation parameter which is a function of the start count and thermal stress, and data established by calculating thermal fatigue and damage degree based on cumulative damage rules for the member whose life is to be assessed and approximating the relationship between the estimation parameter and the thermal fatigue and damage degree and preparing an expression estimating the thermal fatigue and damage degree added with probabilistic statistical processing;

prompting a terminal connected through a network to input the start count and the hardness of the member whose life is to be assessed;

assessing the life of the member from the input start count and hardness by using the approximate expression; and outputting the assessed life to the terminal.

Furthermore, the system can also perform an another method of assessing the life of a member provided in an apparatus which is started and stopped over and over again and subjected to a high in-service temperature for a long period while the apparatus is being operated comprising the steps of:

inputting the start count of the member whose life is to be assessed from a terminal connected to a network; and according to the input, in a service supplying equipment connected to the network, assessing the life of the member by an approximate expression of the relationship between the estimation parameter and the thermal fatigue and damage degree, which is approximated from an estimation parameter which is a function of the start count and thermal stress, and data established by calculating thermal fatigue and damage degree based on cumulative damage rules for the member whose life is to be assessed, and outputting the assessed life to the terminal.

The system can also perform a further method of assessing the life of a member provided in an apparatus which is started and stopped over and over again and subjected to a high in-service temperature for a long period while the apparatus is being operated comprising the steps of:

inputting the start count and hardness of the member whose life is to be assessed from a terminal connected to a network; and according to the input, in a service supplying equipment connected to the network, using an estimation parameter which is a function of the start count and thermal stress, and data established by calculating thermal fatigue and damage degree based on cumulative damage rules, for the member whose life is to be assessed, approximating the relationship between the estimation parameter and the thermal fatigue and damage degree, assessing the life of the member by an expression estimating the thermal fatigue and damage degree added with probabilistic statistical processing, and outputting the assessed life to the terminal.

As described thus far, the present invention provides the following advantages:

(1) Conventionally, in assessing the life of a turbine member, its hardness is measured at in-service inspection time and used to assess the member's life. However, precise life assessment cannot be made without hardness measurement at in-service inspection time, resulting in failure to make quick life assessment. By contrast, the inventive life assessment method and equipment collect variations in hardness of the member with time and probabilistically estimates the hardness of the turbine member. If the initial hardness (hardness at manufacture time) or the hardness at in-service inspection time is available, then the hardness at the time of evaluation can be estimated based on that hardness and a cumulative probability Pf corresponding to the hardness can be determined.

(2) In the absence of hardness data, on the other hand, the hardness at evaluation time can be estimated by estimating the cumulative probability Pf. Even in the case where hardness data is known, the hardness corresponding to the cumulative probability Pf can be estimated by specifying Pf.

(3) Moreover, the thermal fatigue material characteristic and the creep material characteristic is determined as a function of hardness. The use of estimated hardness at evaluation time allows life assessment to be made precisely and quickly.

(4) According to the present invention, the life assessment can be speeded up and the life assessment cost can be reduced in any distant location by receiving input information over the internet 95 from a client, assessing the life of a component through the use of the inventive assessment server, and sending the results of assessment to the client.

According to the present invention, as described above, a life assessment method and equipment can be provided which permit the life of a turbine member subjected to a high in-service temperature to be assessed by collecting the time-varying hardness of the member and estimating probabilistically the hardness of the turbine member.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method of assessing the life of a member provided in an apparatus which is started and stopped over and over again and subjected to a high in-service temperature for a long period while the apparatus is being operated comprising the steps of:
    calculating an estimation parameter which is a function of a set of the start count and thermal stress, and thermal fatigue and damage degree based on cumulative damage rules for the member whose life is to be assessed and establishing data; and
    approximating the relationship between the estimation parameter and the thermal fatigue and damage degree by an approximate expression.

2. The method according to claim 1, where the estimation parameter is an exponential function, and the approximate expression showing the relationship between the estimation parameter and the thermal fatigue and damage degree is a linear equation.

3. The method according to claim 2, wherein the estimation parameter q is given by an expression of $$q=N(\sigma c \cdot nc/N + \sigma w \cdot nw/N + \sigma h \cdot nh/N)^\alpha$$

where $\alpha$ is the constant, $\sigma c$ is the thermal stress of the member at cold start time, $\sigma w$ is the thermal stress of the member at warm start time, $\sigma h$ is the thermal stress of the member at hot start time, N is the total start count, nc is the cold start count, nw is the warm start count, and nh is the hot start count, and
the thermal fatigue and damage degree is approximated by an expression given as $$\phi f = Cf \cdot q$$

where Cf is a constant.

4. The method according to claim 1, further comprising the step of using the approximate expression to assess the life of the member whose life is to be assessed from the start count of the member.

5. A method of assessing the life of a member provided in an apparatus which is started and stopped over and over again and subjected to a high in-service temperature for a long period while the apparatus is being operated comprising the steps of:
    using an estimation parameter which is a function of the start count and thermal stress, and data established by calculating thermal fatigue and damage degree based on cumulative damage rules, for the member whose life is to be assessed, and approximating the relationship between the estimation parameter and the thermal fatigue and damage degree by an approximate expression; and
    estimating the thermal fatigue and damage degree by adding probabilistic statistical processing to this approximate expression.

6. The method according to claim 5, where the estimation parameter is an exponential function, and the approximate expression showing the relationship between the estimation parameter and the thermal fatigue and damage degree is a linear equation.

7. The method according to claim 6, wherein the estimation parameter q is given by an expression of $$q=N(\sigma c \cdot nc/N + \sigma w \cdot nw/N + \sigma h \cdot nh/N)^\alpha$$

where $\alpha$ is the constant, $\sigma c$ is the thermal stress of the member at cold start time, $\sigma w$ is the thermal stress of the member at warm start time, $\sigma h$ is the thermal stress of the member at hot start time, N is the total start count, nc is the cold start count, nw is the warm start count, and nh is the hot start count, and the thermal fatigue and damage degree is approximated by an expression given as $$\phi f = Cf \cdot q$$

where Cf is a constant.

8. The method according to claim 7, wherein the thermal fatigue and damage degree obtained by adding the probabilistic statistical processing to the approximate expression is given by an expression of $$\phi f = Cf \cdot q (\beta \cdot {}^m\sqrt{\ln(1-Pf)^{-1}})$$

where m is the Weibull coefficient, $\beta$ is the scale parameter, and Pf is the cumulative probability.

9. The method according to claim 5, further comprising the step of assessing the life of the member by inputting a cumulative probability into the expression added with the probabilistic statistical processing.

10. The method according to claim 9, wherein the cumulative probability is estimated by the hardness of the member.

11. The method according to claim 10, wherein the cumulative probability Pf corresponds to the cumulative probability Pf defined by the following expression, the cumulative probability Pf depending on the hardness is obtained by an expression given as $$Pf = 1 - exp\{-(\mu/\beta)^m\}$$

where m is the Weibull coefficient, $\beta$ is the scale parameter, and $\mu$ is the hardness of the member (experimental value)/the hardness of the member (estimated value), and further the estimated value of the hardness of the member is obtained by an expression using the least squares method given as $$at+b$$

where t is the total operation time when the hardness of the member is measured, and a and b are constants.

12. The method according to claim 9, wherein the step of assessing the life provides a graph showing relationship between the start count, and the thermal fatigue and damage degree of the member, and the remaining life of the member.

13. A computer program utilized in a computer system, comprising steps of performing the method defined in claim 5.

14. An apparatus for assessing the life of a member provided in an apparatus which is started and stopped over and over again and subjected to a high in service temperature for a long period while the apparatus is being operated comprising:

means for calculating an estimation parameter which is a function of a set of the start count and thermal stress, and thermal fatigue and damage degree based on cumulative damage rules for the member whose life is to be assessed and establishing data; and means for approximating the relationship between the estimation parameter and the thermal fatigue and damage degree by an approximate expression.

15. The apparatus according to claim 14, where the estimation parameter is an exponential function, and the approximate expression showing the relationship between the estimation parameter and the thermal fatigue and damage degree is a linear equation.

16. The apparatus according to claim 15, wherein the estimation parameter q is given by an expression of $$q=N(\sigma c \cdot nc/N+\sigma w \cdot nw/N+\sigma h \cdot nh/N)^\alpha$$

where $\alpha$ is the constant, $\sigma c$ is the thermal stress of the member at cold start time, $\sigma w$ is the thermal stress of the member at warm start time, ah is the thermal stress of the member at hot start time, N is the total start count, nc is the cold start count, nw is the warm start count, and nh is the hot start count, and the thermal fatigue and damage degree is approximated by an expression given as $$\phi f = Cf \cdot q$$

where Cf is a constant.

17. The apparatus according to claim 16, further comprising means for using the approximate expression to assess the life of the member whose life is to be assessed from the start count of the member.

18. An apparatus for assessing the life of a member provided in an apparatus which is started and stopped over and over again and subjected to a high in service temperature for a long period while the apparatus is being operated comprising:

means for using an estimation parameter which is a function of the start count and thermal stress, and data established by calculating thermal fatigue and damage degree based on cumulative damage rules, for the member whose life is to be assessed, and approximating the relationship between the estimation parameter and the thermal fatigue and damage degree by an approximate expression; and means for estimating the thermal fatigue and damage degree by adding probabilistic statistical processing to this approximate expression.

19. The apparatus according to claim 18, where the estimation parameter is an exponential function, and the approximate expression showing the relationship between the estimation parameter and the thermal fatigue and damage degree is a linear equation.

20. The apparatus according to claim 19, wherein the estimation parameter q is given by an expression of $$q=N(\sigma c \cdot nc/N+\sigma w \cdot nw/N+\sigma h \cdot nh/N)^\alpha$$

where $\alpha$ is the constant, $\sigma c$ is the thermal stress of the member at cold start time, $\sigma w$ is the thermal stress of the member at warm start time, oh is the thermal stress of the member at hot start time, N is the total start count, nc is the cold start count, nw is the warm start count, and nh is the hot start count, and the thermal fatigue and damage degree is approximated by an expression given as $$\phi f = Cf \cdot q$$

where Cf is a constant.

21. The apparatus according to claim 20, wherein the thermal fatigue and damage degree obtained by adding the probabilistic statistical processing to the approximate expression is given by an expression of $$\phi f = Cf \cdot q (\beta \cdot {}^m\sqrt{\ln(1-Pf)^{-1}})$$

where m is the Weibull coefficient, $\beta$ is the scale parameter, and Pf is the cumulative probability.

22. The method according to claim 18, further comprising the step of assessing the life of the member by inputting a cumulative probability into the expression added with the probabilistic statistical processing.

23. The apparatus according to claim 22, wherein the cumulative probability is estimated by the hardness of the member.

24. The apparatus according to claim 23, wherein the cumulative probability Pf corresponds to the cumulative probability Pf defined by the following expression, the cumulative probability Pf depending on the hardness is obtained by an expression given as $$Pf=1-exp\{-(\mu/\beta)^m\}$$

where m is the Weibull coefficient, $\beta$ is the scale parameter, and $\mu$ is the hardness of the member (experimental value)/the hardness of the member (estimated value), and further the estimated value of the hardness of the member is obtained by an expression using the least square method given as $$at+b$$

where t is the total operation time when the hardness of the member is measured, and a and b are constants.

25. The apparatus according to claim 22, wherein the step of assessing the life provides a graph showing relationship between the start count, and the thermal fatigue and damage degree of the member, and the remaining life of the member.

26. A method of assessing the life of a member provided in an apparatus which is started and stopped over and over again and subjected to a high in-service temperature for a long period while the apparatus is being operated comprising the steps of:

from an estimation parameter which is a function of a set of the start count and thermal stress, and data established by calculating thermal fatigue and damage degree based on cumulative damage rules for the member whose life is to be assessed, preparing an approximate expression of the relationship between the estimation parameter and the thermal fatigue and damage degree;

prompting a terminal connected through a network to input the start count of the member whose life is to be assessed;

assessing the life of the member from the input start count by using the approximate expression; and outputting the assessed life to the terminal.

27. A method of assessing the life of a member provided in an apparatus which is started and stopped over and over again and subjected to a high in-service temperature for a long period while the apparatus is being operated comprising the steps of:

using an estimation parameter which is a function of the start count and thermal stress, and data established by calculating thermal fatigue and damage degree based on cumulative damage rules for the member whose life is to be assessed and approximating the relationship between the estimation parameter and the thermal fatigue and damage degree and preparing an expression estimating the thermal fatigue and damage degree added with probabilistic statistical processing;

prompting a terminal connected through a network to input the start count and the hardness of the member whose life is to be assessed;

assessing the life of the member from the input start count and hardness by using the approximate expression; and outputting the assessed life to the terminal.

28. A method of assessing the life of a member provided in an apparatus which is started and stopped over and over again and subjected to a high in-service temperature for a long period while the apparatus is being operated comprising the steps of:

inputting the start count of the member whose life is to be assessed from a terminal connected to a network; and according to the input, in a service supplying equipment connected to the network, assessing the life of the member by an approximate expression of the relationship between the estimation parameter and the thermal fatigue and damage degree, which is approximated from an estimation parameter which is a function of the start count and thermal stress, and data established by calculating thermal fatigue and damage degree based on cumulative damage rules for the member whose life is to be assessed, and outputting the assessed life to the terminal.

29. A method of assessing the life of a member provided in an apparatus which is started and stopped over and over again and subjected to a high in-service temperature for a long period while the apparatus is being operated comprising the steps of:

inputting the start count and hardness of the member whose life is to be assessed from a terminal connected to a network; and according to the input, in a service supplying equipment connected to the network, using an estimation parameter which is a function of the start count and thermal stress, and data established by calculating thermal fatigue and damage degree based on cumulative damage rules, for the member whose life is to be assessed, approximating the relationship between the estimation parameter and the thermal fatigue and damage degree, assessing the life of the member by an expression estimating the thermal fatigue and damage degree added with probabilistic statistical processing, and outputting the assessed life to the terminal 30. An apparatus for assessing the life of a member provided in an apparatus which is started and stopped over and over again and subjected to a high in service temperature for a long period while the apparatus is being operated comprising:

means, from an estimation parameter which is a function of a set of the start count and thermal stress, and data established by calculating thermal fatigue and damage degree based on cumulative damage rules for the member whose life is to be assessed, for preparing an approximate expression of the relationship between the estimation parameter and the thermal fatigue and damage degree;

means for prompting a terminal connected through a network to input the start count of the member whose life is to be assessed;

means for assessing the life of the member from the input start count by using the approximate expression; and means for outputting the assessed life to the terminal.

31. An apparatus for assessing the life of a member provided in an apparatus which is started and stopped over and over again and subjected to a high in service temperature for a long period while the apparatus is being operated, comprising:

means for using an estimation parameter which is a function of the start count and thermal stress, and data established by calculating thermal fatigue and damage degree based on cumulative damage rules for the member whose life is to be assessed and approximating the relationship between the estimation parameter and the thermal fatigue and damage degree and preparing an expression estimating the thermal fatigue and damage degree added with probabilistic statistical processing;

means for prompting a terminal connected through a network to input the start count and the hardness of the member whose life is to be assessed;

means for assessing the life of the member from the input start count and hardness by using the approximate expression; and means for outputting the assessed life to the terminal.

32. An apparatus for assessing the life of a member provided in an apparatus which is started and stopped over and over again and subjected to a high in service temperature for a long period while the apparatus is being operated, comprising:

means for inputting the start count of the member whose life is to be assessed from a terminal connected to a network; and means for according to the input, in a service supplying equipment connected to the network, assessing the life of the member by an approximate expression of the relationship between the estimation parameter and the thermal fatigue and damage degree, which is approxi mated from an estimation parameter which is a function of the start count and thermal stress, and data established by calculating thermal fatigue and damage degree based on cumulative damage rules for the member whose life is to be assessed, and outputting the assessed life to the terminal.

33. An apparatus for assessing the life of a member provided in an apparatus which is started and stopped over and over again and subjected to a high in service temperature for a long period while the apparatus is being operated, comprising:

means for inputting the start count and hardness of the member whose life is to be assessed from a terminal connected to a network; and means, according to the input, in a service supplying equipment connected to the network, for using an estimation parameter which is a function of the start count and thermal stress, and data established by calculating thermal fatigue and damage degree based on cumulative damage rules, for the member whose life is to be assessed, approximating the relationship between the estimation parameter and the thermal fatigue and damage degree, assessing the life of the member by an expression estimating the thermal fatigue and damage degree added with probabilistic statistical processing, and outputting the assessed life to the terminal.

* * * * *